US012746865B2

(12) United States Patent
Kalmutzki et al.

(10) Patent No.: US 12,746,865 B2
(45) Date of Patent: Sep. 29, 2026

(54) PNEUMATIC BLADDER ARRANGEMENT FOR NECKREST

(71) Applicant: SCHUKRA BERNDORF GMBH, Berndorf (AT)

(72) Inventors: Martin Kalmutzki, Spalt (DE); Felix Severin Roth, Nuremberg (DE)

(73) Assignee: SCHUKRA BERNDORF GMBH, Berndorf (AT)

( * ) Notice: Subject to any disclaimer, the term of this patent is extended or adjusted under 35 U.S.C. 154(b) by 205 days.

(21) Appl. No.: 18/576,045

(22) PCT Filed: May 17, 2022

(86) PCT No.: PCT/EP2022/063290
§ 371 (c)(1),
(2) Date: Jan. 2, 2024

(87) PCT Pub. No.: WO2023/001425
PCT Pub. Date: Jan. 26, 2023

(65) Prior Publication Data

US 2024/0308403 A1 Sep. 19, 2024

(30) Foreign Application Priority Data

Jul. 22, 2021 (EP) ..................................... 21187286

(51) Int. Cl.
*B60N 2/90* (2018.01)
*B60N 2/885* (2018.01)
(Continued)

(52) U.S. Cl.
CPC ............. *B60N 2/914* (2018.02); *B60N 2/885* (2018.02); *A47C 7/467* (2013.01); *A47G 9/1027* (2013.01); *B60N 2/64* (2013.01); *B60N 2/976* (2018.02)

(58) Field of Classification Search
CPC ........ B60N 2/914; B60N 2/885; B60N 2/665; B60N 2/882; A47C 7/383; A47C 7/467; A47G 9/1027; A47G 9/1081
See application file for complete search history.

(56) References Cited

U.S. PATENT DOCUMENTS 2,589,155 A * 3/1952 Smith ................. B61D 33/005 156/251
2,684,672 A 7/1954 Summerville
(Continued)

FOREIGN PATENT DOCUMENTS

CN 1629504 A 6/2005
CN 201071958 Y 6/2008
(Continued)

OTHER PUBLICATIONS

Chinese Patent Office Action for Application No. 201980017369.4 dated Jan. 28, 2022 (15 pages, including English translation).
(Continued)

*Primary Examiner* — Syed A Islam
(74) *Attorney, Agent, or Firm* — MICHAEL BEST & FRIEDRICH LLP

(57) ABSTRACT

The invention relates to a pneumatic bladder arrangement (300) for a neckrest (N) or cushion support (C) of a seat (S) comprising a base inflatable bladder (320) having a shape mainly elongated along a longitudinal axis (X), at least two side inflatable bladders (330), partially overlapping the base inflatable bladder (320) and positioned so that end regions (R1, R3) of the base inflatable bladder (320) are covered by the side inflatable bladders (330) while a central region (R2) of the base inflatable bladder (320) is not covered by the side inflatable bladders (330). The invention further relates to a neckrest (N), a seat comprising the neckrest (N) and to a seat comprising the cushion support (C).

21 Claims, 14 Drawing Sheets

(51) Int. Cl.
*A47C 7/46* (2006.01)
*A47G 9/10* (2006.01)
*B60N 2/64* (2006.01)

(56) References Cited

U.S. PATENT DOCUMENTS 3,017,221 A * 1/1962 Emery .................. B60N 2/882 297/DIG. 3
3,232,305 A 2/1966 Groeber
3,306,538 A 2/1967 McCracken, Jr.
3,339,668 A 9/1967 Trainor
3,390,674 A 7/1968 Jones
3,444,897 A 5/1969 McCleod, Jr.
3,536,084 A 10/1970 Dorsey et al.
3,566,862 A 3/1971 Schuh et al.
3,587,568 A 6/1971 Thomas
3,680,574 A 8/1972 Price
3,720,218 A 3/1973 Drzewiecki
3,734,116 A 5/1973 Trask, II
3,958,602 A 5/1976 Manion et al.
4,225,989 A 10/1980 Corbett et al.
4,258,753 A 3/1981 Limpaecher
4,373,553 A 2/1983 Drzewiecki
4,538,701 A 9/1985 Lowery et al.
4,549,574 A 10/1985 Taylor
4,565,259 A 1/1986 Stoll
4,572,327 A 2/1986 Dean
4,747,467 A 5/1988 Lyon et al.
4,756,230 A 7/1988 Shew
4,840,425 A 6/1989 Noble
5,266,754 A 11/1993 Swift
5,273,406 A 12/1993 Feygin
5,330,255 A * 7/1994 Stawicki ................ B60N 2/914 297/391
5,383,711 A * 1/1995 Houghteling .......... B60N 2/882 5/636
5,659,158 A 8/1997 Browning et al.
5,677,518 A 10/1997 Fischer et al.
5,752,742 A 5/1998 Kerner et al.
5,996,731 A 12/1999 Czabala et al.
6,131,696 A 10/2000 Esslinger
6,220,668 B1 4/2001 Scheffzuck
6,572,570 B1 6/2003 Burns et al.
6,722,467 B1 4/2004 Kusche et al.
6,767,331 B2 7/2004 Stouffer et al.
6,860,157 B1 3/2005 Yang et al.
6,916,300 B2 7/2005 Hester et al.
6,976,507 B1 12/2005 Webb et al.
7,037,280 B1 5/2006 Burns et al.
7,096,888 B1 8/2006 Thurston et al.
7,128,082 B1 10/2006 Cerretelli et al.
7,445,083 B2 11/2008 Wu
8,043,238 B1 10/2011 Tamura et al.
8,430,202 B1 4/2013 Mason et al.
8,550,208 B1 10/2013 Potokar
8,770,229 B2 7/2014 Gopalan et al.
8,850,642 B2 * 10/2014 Rasmussen .......... A47G 9/1027 5/636
9,119,705 B2 9/2015 Parish et al.
9,526,360 B2 * 12/2016 Sternlight ................ A47G 9/10
9,573,679 B2 2/2017 Golling et al.
9,618,150 B2 4/2017 Bauer et al.
9,989,159 B2 6/2018 Winkler et al.
10,099,582 B2 10/2018 Wagner et al.
10,724,549 B2 7/2020 Le et al.
11,008,106 B2 * 5/2021 Parrilla Calle ........ B60N 2/888
11,432,995 B2 9/2022 O'moore et al.
11,712,986 B2 * 8/2023 Makiguchi ............. B60N 2/665 297/284.6
11,752,062 B2 9/2023 Watson et al.
11,858,391 B2 * 1/2024 Ryszawa ................ B60N 2/525
11,883,358 B2 1/2024 Arthurs et al.
12,070,436 B2 8/2024 Watson et al.
2003/0070870 A1 4/2003 Reynolds
2003/0234567 A1 12/2003 O'Connor
2004/0097854 A1 5/2004 Hester et al.
2005/0067218 A1 3/2005 Bristow et al.
2006/0144638 A1 7/2006 Radatus et al.
2006/0250015 A1 * 11/2006 Buck ...................... B60N 2/882 297/397
2007/0033737 A1 * 2/2007 Melton .................. A47C 7/383 5/640
2007/0241594 A1 * 10/2007 Taylor .................... B60N 2/882 297/216.12
2007/0257533 A1 * 11/2007 Resendez ............. B60N 2/6063 297/228.11
2008/0036253 A1 * 2/2008 Lee ........................ B60N 2/882 297/220
2008/0121295 A1 5/2008 Tippetts
2009/0294211 A1 12/2009 Roberts
2010/0299838 A1 * 12/2010 Lanci ..................... B60N 2/882 5/636
2011/0108358 A1 5/2011 Edgington et al.
2011/0297479 A1 12/2011 Butler
2012/0055560 A1 3/2012 Gopalan et al.
2012/0143108 A1 6/2012 Boscanyi et al.
2013/0035619 A1 2/2013 Freund
2013/0053102 A1 2/2013 Inagaki
2013/0187419 A1 7/2013 Worlitz et al.
2014/0041125 A1 * 2/2014 Grealy ..................... B60N 3/06 5/655.3
2014/0088468 A1 3/2014 Murison
2014/0299130 A1 10/2014 Librett et al.
2015/0197170 A1 7/2015 Obukhov
2016/0106620 A1 4/2016 Uno et al.
2016/0213553 A1 7/2016 Oberg et al.
2016/0229320 A1 8/2016 Lem et al.
2017/0080834 A1 3/2017 Dry
2017/0113581 A1 4/2017 Mussi et al.
2017/0156505 A1 * 6/2017 Cheng .................... A47C 7/142
2018/0049568 A1 * 2/2018 Cruz .................... A47C 27/082
2018/0056833 A1 3/2018 Kühne
2018/0064253 A1 3/2018 Demore et al.
2018/0148187 A1 5/2018 Valleroy et al.
2018/0156629 A1 6/2018 Lem et al.
2018/0178694 A1 6/2018 McMillen et al.
2018/0272902 A1 9/2018 Lem et al.
2019/0008265 A1 * 1/2019 Mitchell ................... A45F 3/02
2019/0075932 A1 3/2019 Yu et al.
2019/0263297 A1 * 8/2019 Kealoha ............... B60N 2/2851
2022/0202214 A1 * 6/2022 Garfield ............... A47G 9/1081
2023/0414016 A1 * 12/2023 Chen .................... A47G 9/1063

FOREIGN PATENT DOCUMENTS

CN 101467931 A 7/2009
CN 101563531 A 10/2009
CN 202314061 U 7/2012
CN 103655147 A 3/2014
CN 104024044 A 9/2014
CN 106942931 A 7/2017
CN 108082016 A 5/2018
DE 2536901 A1 1/1977
DE 3240710 A1 10/1984
DE 4335778 A1 4/1995
DE 19509489 A1 9/1996
DE 19955046 A1 5/2001
DE 10334510 A1 2/2005
DE 102005030258 A1 1/2007
DE 102007051759 A1 5/2009
DE 102008024995 A1 11/2009
DE 102009005492 A1 7/2010
DE 102011018272 A1 10/2012
DE 102012009366 A1 11/2013
DE 102012214220 A1 5/2014
DE 102015100141 A1 7/2016
DE 102015220015 A1 4/2017
EP 1096913 A1 5/2001
EP 1193141 A3 4/2002
EP 1326569 A1 7/2003
EP 1687543 A 8/2006
EP 1722356 A1 11/2006
EP 1851447 A1 11/2007

(56) References Cited

FOREIGN PATENT DOCUMENTS

| | | | |
|---|---|---|---|
| EP | 1760262 | B1 | 4/2008 |
| EP | 2012022 | A2 | 1/2009 |
| EP | 1904337 | B1 | 10/2010 |
| EP | 2682612 | A2 | 1/2014 |
| EP | 2627914 | B1 | 9/2018 |
| EP | 3597477 | A1 | 1/2020 |
| GB | 2310371 | A | 8/1997 |
| JP | H0623306 | A | 2/1994 |
| JP | 2000084020 | A | 3/2000 |
| JP | 2018140752 | A | 9/2018 |
| KR | 20130002774 | U | 5/2013 |
| KR | 1020180009575 | A | 1/2018 |
| TW | M283636 | U | 12/2005 |
| WO | 1996029914 | A1 | 10/1996 |
| WO | 199709527 | A1 | 3/1997 |
| WO | 2000067691 | A1 | 11/2000 |
| WO | 2002034195 | A1 | 5/2002 |
| WO | 2005080800 | A1 | 9/2005 |
| WO | 2006090130 | A1 | 8/2006 |
| WO | 2010108254 | A1 | 9/2010 |
| WO | 2012048853 | A1 | 4/2012 |
| WO | 2014039661 | A1 | 3/2014 |
| WO | 2015039701 | A1 | 3/2015 |
| WO | 2015088463 | A1 | 6/2015 |
| WO | 2019169471 | A1 | 9/2019 |

OTHER PUBLICATIONS

European Patent Office Extended European Search Report for application No. 21187286.6, dated May 2, 2022 (10 pages).

European Patent Office Extended Search Report for Application No. 19764160.8 dated Oct. 28, 2021 (9 pages).

European Patent Office. Office Action for Application No. 19764160.8 dated Feb. 1, 2023 (5 pages).

International Search Report and Written Opinion for Application No. PCT/CA2019/000030 dated Apr. 17, 2019 (17 pages).

International Search Report and Written Opinion for Application No. PCT/EP2022/063290 dated May 17, 2022 (16 pages).

Japanese Patent Office Action for Application No. 2020-546336 dated Oct. 26, 2021 (6 pages including English translation).

European Patent Office Action for Application No. 21187286.6 dated May 7, 2024 (6 pages).

* cited by examiner

PNEUMATIC BLADDER ARRANGEMENT FOR NECKREST

The present invention relates to a pneumatic bladder arrangement for a seat, in particular as a part of a neckrest or cushion of a seat, and to a seat incorporating the pneumatic bladder arrangement.

PRIOR ART

Seats, particularly vehicle seats such as for cars, are known to have a backrest and a headrest. As can be seen in FIG. 1, the headrest H is generally connected to the backrest B in a movable manner, to accommodate occupants of different height. Generally, this is achieved by the use of one or more rods R for connecting the headrest H to the backrest B.

This configuration has the problem that, in order to account for users of lower height, most users will experience a gap between the headrest H and the backrest B. This can lead to both comfort and safety issues.

For some seats in which the occupant spends a long time, this can become a nuisance, uncomfortable or even painful. Moreover, for seats associated with large expenses, such as car seats, the users expect a very comfortable seating position. It would therefore be preferable to provide some sort of support for the neck, such as a neckrest.

Moreover, due to the various body shapes of different users, it would be preferable if the neckrest was configurable so as to accommodate different neck shapes. That is, not only the thickness of the neckrest should be configurable, so as to adapt to the distance of the neck from the seat S, but the neckrest should also have a shaper which can be configured to adapt to wider or narrower necks.

From a safety perspective, the gap between the headrest H and backrest B can lead to issues such as whiplash, or worse, in case of an accident when the seat is mounted in a vehicle, for instance a car. In addition to providing support on the back of the neck, it would thus also be preferable for the neckrest to provide some level of lateral support which can be advantageous in case of lateral impact.

Various neckrest configurations are known from documents WO 2015/088463 A1, WO 1996/029914 A1, DE 102011018272 A1, US 2018/0056833 A1, DE 102008024995 A1, US 2018/0064253 A1, KR 102018009575 A, GB 2310371 A, DE 102005030258 A1, U.S. Pat. No. 10,099,582 B2, DE 19851027 A1, DE 10334510 A1, DE 19528716 A1, DE102009005492 A1, DE 19955046 A1, CN 108082016 A, DE 102012009366 A1, US 2003/0234567 A1.

In general, known systems employ one or more rigid, mechanical elements, such as plates, pivots and joints, for implementing the neckrest. This causes the known systems to be expensive and complex to manufacture and assembly. Additionally, rigid mechanical mechanisms may cause safety dangers in the event of collisions, when the seats are mounted in vehicles. Additionally, many known solutions are not able to provide a suitable level of configuration of the neckrest to fully adapt to the various possible shapes of the users' body.

Moreover, the cushion of a seat generally incorporates more and more functionalities such as the possibility to configure the level of support of various areas of the cushion and/or massage functionalities.

It would thus be convenient to provide a device capable of allowing various cushion configurations to be implemented and/or capable of providing a massage functionality.

SUMMARY

The present invention has been developed to address at least some of the problems existing with the known solution and generally involves at least parts of the neckrest and/or at least parts of the cushion being implemented through a pneumatic bladder arrangement.

The invention is defined by the independent claims. Dependent claims further indicate additional advantageous implementation features.

An aspect can in particular relate to a pneumatic bladder arrangement for a neckrest or cushion support of a seat comprising a base inflatable bladder having a shape mainly elongated along a longitudinal axis, at least two side inflatable bladders, partially overlapping the base inflatable bladder and positioned so that end regions of the base inflatable bladder are covered by the side inflatable bladders while a central region of the base inflatable bladder is not covered by the side inflatable bladders.

Thanks to this arrangement it is possible to obtain a larger thickness in correspondence with the end regions, compared to the central region, when the pneumatic bladder arrangement is inflated. This difference in thickness can be used in a neckrest to at least partially wrap around the neck of a user, providing rear and lateral support. In a cushion support it can be used to provide lateral support of the thighs or support under them.

In some cases, when the pneumatic bladder arrangement is inflated, a first thickness of the pneumatic bladder arrangement at the end regions can be thicker than a second thickness of the pneumatic bladder arrangement at the central region.

In some cases, the first thickness can be comprised between 70 mm and 140 mm, preferably between 30 mm and 120 mm, the second thickness can be comprised between 30 mm and 120 mm, preferably between 50 mm and 70 mm.

Those values have been found by the inventors to be particularly well suited to the use of the pneumatic bladder arrangement in a neckrest and/or as a cushion support.

In some cases, the base inflatable bladder can have a first height, perpendicular to the longitudinal axis and in correspondence with the end regions, and a second height, perpendicular to the longitudinal axis in correspondence with the central region wherein the first height can be bigger than the second height.

Thanks to this arrangement, the difference in thickness between the central region and the end regions can be obtained and/or incremented.

In some cases, the first height can be comprised between 50 mm and 200 mm, preferably between 70 mm and 150 mm, the second height can be comprised between 40 mm and 180 mm, preferably between 50 mm and 120 mm.

Those values have been found by the inventors to be particularly well suited to the use of the pneumatic bladder arrangement in a neckrest.

In some cases, the base inflatable bladder can have a width along the longitudinal axis comprised between 100 mm and 400 mm, preferably between 200 mm and 300 mm, and/or each of the end regions can have a width along the longitudinal axis comprised between 0 mm and 150 mm, preferably between 40 mm and 100 mm, and/or the central region has a width along the longitudinal axis comprised between 50 mm and 200 mm, preferably between 80 mm and 130 mm.

Those values have been found by the inventors to be particularly well suited to the use of the pneumatic bladder arrangement in a neckrest.

In some cases, the base inflatable bladder can have a width along the longitudinal axis comprised between 100 mm and 600 mm, preferably between 400 mm and 500 mm, and/or each of the end regions can have a width along the longitudinal axis comprised between 0 mm and 150 mm, preferably between 40 mm and 100 mm, and/or the central region can have a width along the longitudinal axis comprised between 100 mm and 400 mm, preferably between 150 mm and 250 mm.

Those values have been found by the inventors to be particularly well suited to the use of the pneumatic bladder arrangement as a cushion support.

In some cases, at least one of the side inflatable bladders can have a substantially trapezoidal shape.

Thanks to this arrangement, the side inflatable bladder can present a difference in thickness along its length, and preferably a lower thickness toward the central region.

In some cases, at least one of the side inflatable bladders can have two substantially parallel edges, comprising a shorter edge and a longer edge, and the shorter edge can be closer to the central region than the longer edge.

Thanks to this arrangement, the side inflatable bladder can present a difference in thickness along its length, and preferably a lower thickness toward the central region.

In some cases, at least one of the side inflatable bladders can be folded at a folding line in two substantially overlapping portions, so as to form a U-shape.

Thanks to this arrangement, the side inflatable bladder can present a difference in thickness along its length, and preferably a lower thickness toward the central region.

In some cases, the folding line can be substantially perpendicular to the longitudinal axis of the base inflatable bladder. In some cases, the central region can be closer to the folding line than to an open side of the U-shape.

Thanks to this arrangement, the side inflatable bladder can present a difference in thickness along its length, and preferably a lower thickness toward the central region.

In some cases, the pneumatic bladder arrangement can further comprise at least one fluid supply connection for inflating and/or deflating the base inflatable bladder and/or the at least two side inflatable bladders. In some cases, the pneumatic bladder arrangement can further comprise at least one fluid supply interconnection for connecting at least two between the base inflatable bladder and any of the at least two side inflatable bladders. In some cases, the fluid supply interconnection can connect the at least two side inflatable bladders to each other.

Thank to those arrangements it is possible to control the base inflatable bladder independently from the at least two side inflatable bladders, preferably with a reduced number of fluid supply connections.

In some cases, the base inflatable bladder can comprise at least one hole for connecting to at least one of the at least two side inflatable bladders.

Thanks to this arrangement, the number of fluid supply connections can be reduced.

In some cases, the base inflatable bladder can comprise at least two first sheets of flexible material, wherein each of the at least two side inflatable bladders can comprise at least two second sheets of flexible material, wherein one of the first sheets of flexible material can comprise the hole and wherein one of the second sheets of flexible material can comprise the hole.

Thanks to this arrangement the hole can be implemented in an efficient and effective manner.

In some cases, the one of the first sheets of flexible material comprising the hole can be bound to the one of the second sheets of flexible material comprising the hole.

Thanks to this arrangement the implementation of the hole can also allow connection of the bladders.

In some cases, one or more among the base inflatable bladder and the at least two side inflatable bladders can comprise at least one connecting strap configured to connect to a frame of the neckrest.

Thanks to this implementation, the connection to the frame can be easily implemented.

A further aspect can relate to a neckrest comprising a frame, and a pneumatic bladder arrangement, according to any previous aspects, mounted on the frame.

In some cases, the frame can comprise connecting means for connection to a headrest and/or to one or more rods connecting the headrest to the seat.

Thanks to this arrangement it is possible to configure the position of the neckrest, preferably in a manner depending on the position of the headrest.

In some cases, the frame can comprise base mounting means for connection to the base inflatable bladder, and at least two side mounting means for respective connection to the at least two side inflatable bladders.

Thanks to this arrangement it is possible to control the inflation width of the side inflatable bladders and thus the width of the central region. Moreover, a better lateral support can be obtained, which can also be configured by configuring the angle between the side mounting means and the base mounting means.

A further aspect can relate to a seat having a neckrest comprising a pneumatic bladder arrangement according to any of the previous aspects.

A further aspect can relate to a seat having a cushion support comprising a pneumatic bladder arrangement according to any of the previous aspects.

A further aspect can relate to a seat having a cushion support comprising two pneumatic bladder arrangements according to any previous aspect, one for each leg.

A further aspect can relate to an extendable cushion support comprising a pneumatic bladder arrangement according to any previous aspect, and a frame.

A further aspect can relate to an extendable cushion support comprising two pneumatic bladder arrangements according to any previous aspect, one for each leg, and a frame.

In some embodiments, the frame can be mounted in a pivotable manner to the seat.

A further aspect can relate to a seat having an extendable cushion support, or an extendable cushion support comprising a pneumatic bladder arrangement according to any previous aspect.

DETAILED DESCRIPTION OF PREFERRED EMBODIMENTS

In the following description, reference will be made to the use of a pneumatic bladder arrangement as part of a neckrest N or as a cushion support C. It will be clear that features of the pneumatic bladder arrangement described in relation to example applications as a neckrest can also be implemented in applications as a cushion support C, and vice versa.

Figure 1:
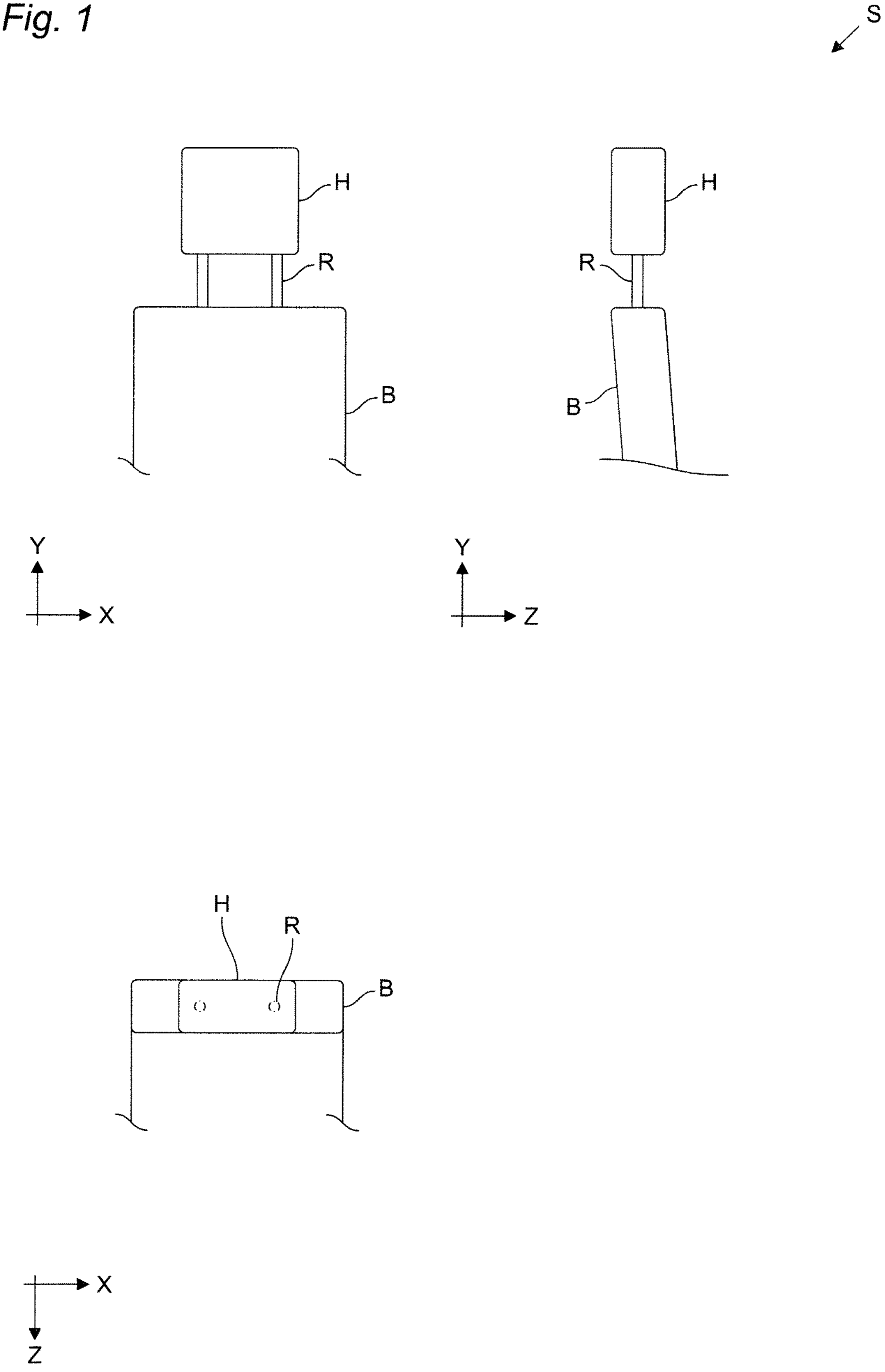
FIG. 1 schematically illustrates a front, side and top view of a seat S according to the prior art, FIG. 2 schematically illustrates a front, side and top view of a seat S comprising a neckrest N in a substantially inflated configuration, FIG. 3A schematically illustrates enlarged front, side and two top views of a neckrest N in a substantially inflated configuration, FIG. 3B schematically illustrates enlarged front and side views of a neckrest N in a substantially inflated configuration, FIG. 4 schematically illustrates enlarged front and top views of a base inflatable bladder 420 for a neckrest in a substantially inflated configuration, FIG. 5 schematically illustrates enlarged front and top views of a side inflatable bladder 530 for a neckrest in a substantially inflated configuration, FIG. 6 schematically illustrates enlarged front and top views of a side inflatable bladder 630 for a neckrest in a substantially deflated configuration, on the left, and in a substantially inflated configuration, on the right, FIG. 7 schematically illustrates enlarged front and side views of a pneumatic bladder arrangement 700 for a neckrest in a substantially inflated configuration, FIG. 8 schematically illustrates an enlarged front view of a pneumatic bladder arrangement 800 for a neckrest, FIG. 9 schematically illustrates enlarged cross-section and exploded view of a pneumatic bladder arrangement 900 for a neckrest, FIG. 10 schematically illustrates enlarged front and side views of a of a pneumatic bladder arrangement 1000, FIGS. 11A, 11B and 11C each schematically illustrate a front, side and top view of a seat S comprising cushion supports C in a substantially inflated configuration, FIG. 12 schematically illustrates enlarged front, side and two top views of a neckrest N in a substantially inflated configuration as well as an enlarged top view of the neckrest N in a substantially deflated configuration, FIGS. 13A, 13B and 13C each schematically illustrate a front, side and top view of a seat S comprising extendable cushion supports EC in a substantially inflated configuration.
Figure 2:
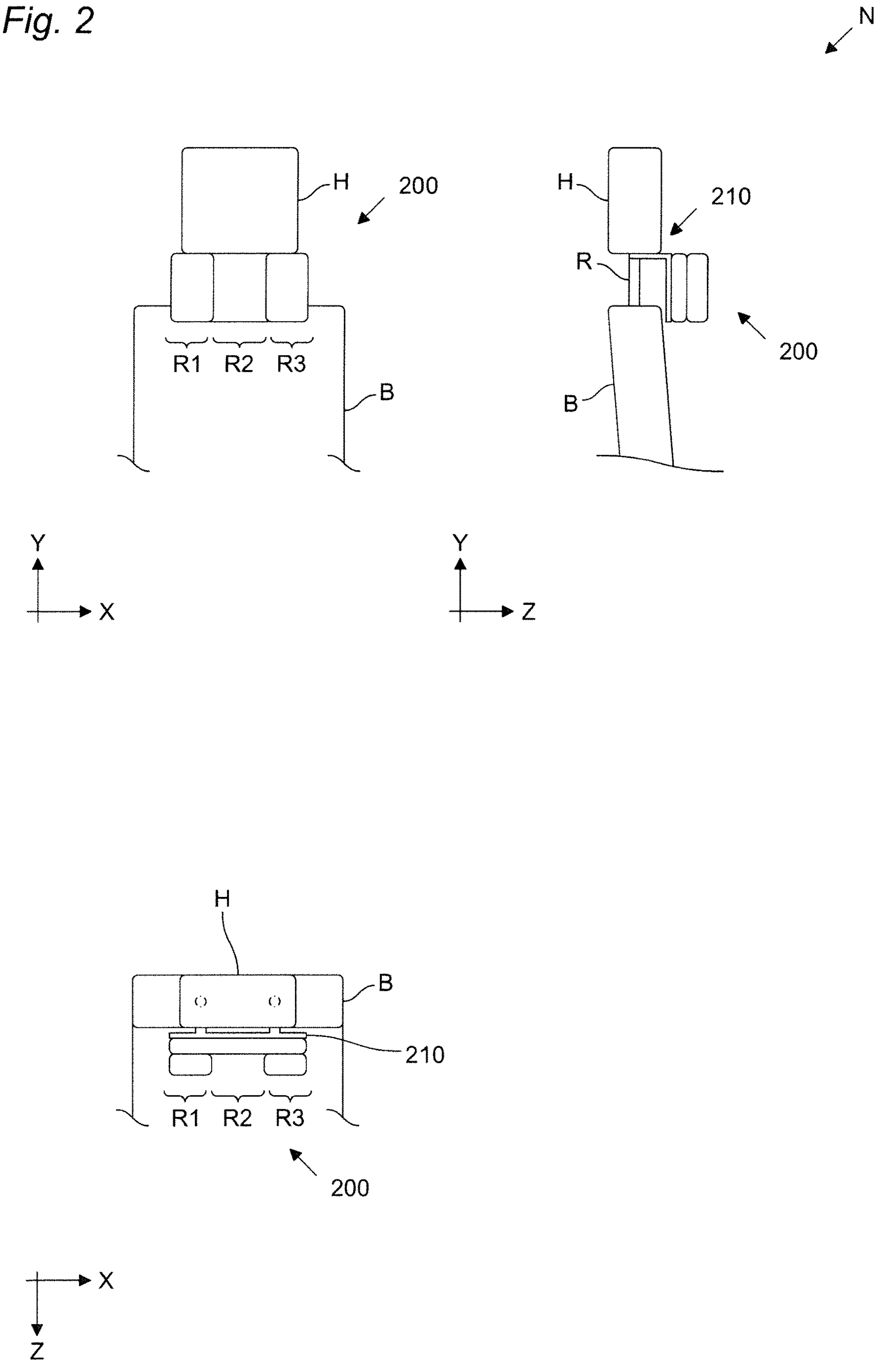

FIG. 2 schematically illustrates a front view, on the top left, a side view, on the top right, and top view, on the bottom left, of a seat S comprising a neckrest N in a substantially inflated configuration.

Throughout the description, the expression substantially inflated, or inflated, relates to an inflation of at least 30%, preferably at least 60%, even more preferably at least 90% of the pneumatic bladder arrangement comprised in the neckrest.

For explanation purposes, the seat S will be illustrated and referred to as the seat of a vehicle, preferably of a car. It will however be clear that the invention is not limited thereto and it can be applied to any seat. Application to a vehicle seat is particularly advantageous as the invention, compared to the prior art, achieves a low weight and a high degree of adaptation of the seat to the body of the occupant, both of which are criteria which are generally requested and appreciated in vehicle seats. Moreover, the invention drastically reduces the number of parts which might pose a risk in a collision. To the contrary, by introducing pneumatic bladders, it might even form a passive safety device in case of a collision. Both those features are highly appreciated in vehicle seats.

Throughout the description, the front view is intended to be a view from direction Z, with reference to the drawings. That is, a view from a direction substantially perpendicular to the plane of the backrest B. Alternatively, or in addition, the front view can be understood as a view from a direction substantially perpendicular to a plane comprising the neckrest when the neckrest is in a substantially deflated configuration.

Similarly, throughout the description, the side view is intended to be a view from direction X, with reference to the drawings. That is, a view from a direction substantially parallel to the plane of the backrest B and perpendicular to a vertical extension direction of the backrest B. Alternatively, or in addition, the side view can be understood as a view from a direction substantially parallel to a main longitudinal extension direction of the neckrest, at least when the neckrest is in a substantially deflated configuration.

Similarly, throughout the description, the top view is intended to be a view from direction Y, with reference to the drawings. That is, a view from a direction substantially parallel to the plane of the backrest B and parallel to a vertical extension direction of the backrest B. Alternatively, or in addition, the top view can be understood as a view from a direction substantially parallel to a plane comprising the neckrest and perpendicular to a main longitudinal extension direction of the neckrest, at least when the neckrest is in a substantially deflated configuration.

Figure 3A:
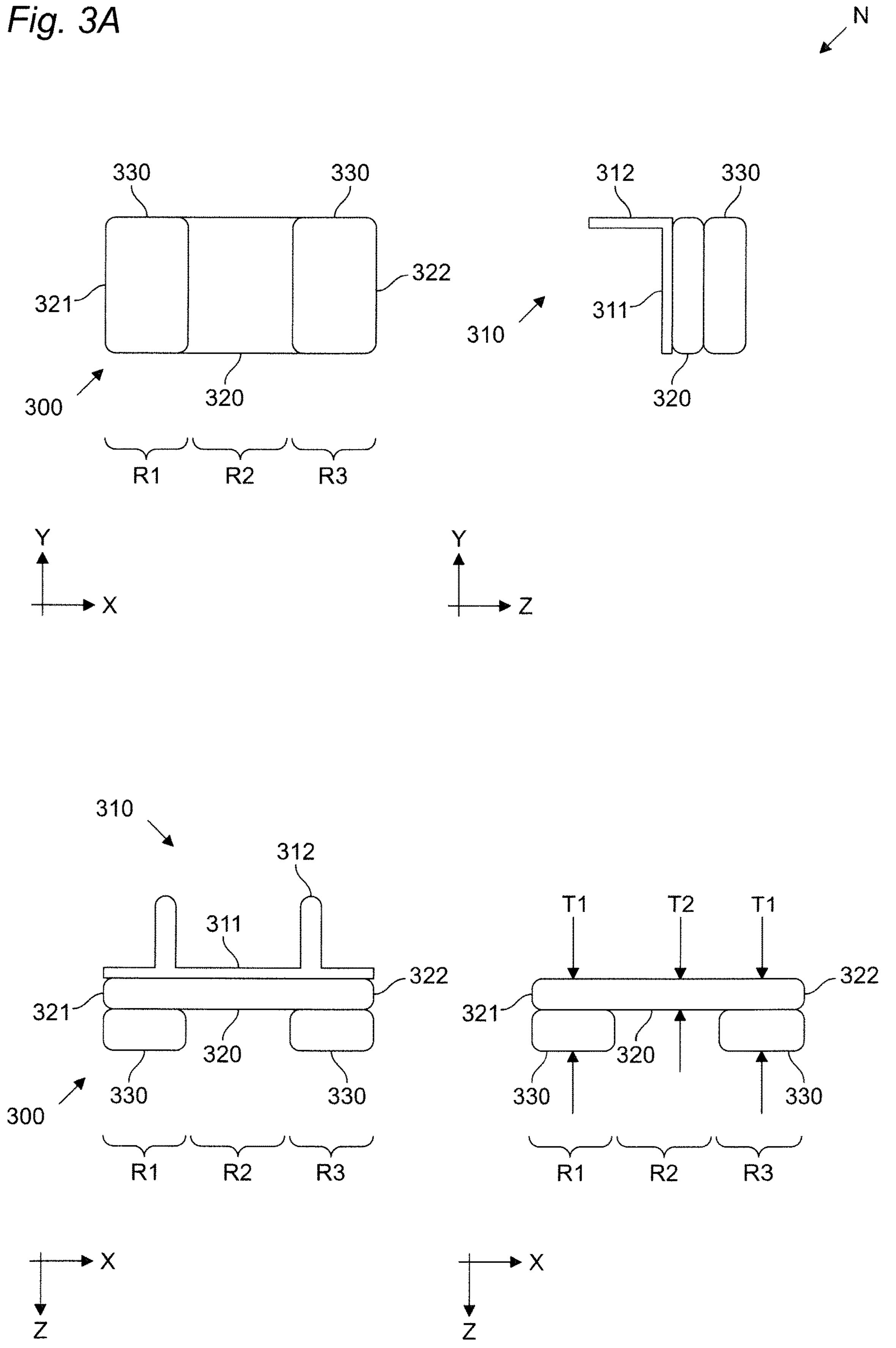

As can be seen in FIGS. 2 and 3A, the neckrest N generally comprises a frame 210, 310, and a pneumatic bladder arrangement 200, 300 mounted on the frame 210, 310.

The frame 210, 310 can generally be understood as any mechanical support for the pneumatic bladder arrangement 200, 300, capable of positioning the pneumatic bladder arrangement 200, 300, in a position of the seat S substantially corresponding to the position of a neck of a user. It will be clear to those skilled in the art that, depending on the configuration of the seat S and/or of the frame of the seat S, various possible implementations of the frame 210, 310 for the neckrest S will be practicable.

In the exemplary illustrations of FIGS. 2 and 3A, an exemplary frame 210, 310 has been provided for explanation purposes. It will however be clear that the invention is not limited to the specifically illustrated configuration.

As can be better seen in FIG. 3A, one possible implementation for the frame 310 comprises mounting means 311 and connecting means 312. The mounting means 311 can be in general any means allowing the mounting of the pneumatic bladder arrangement to the frame 310. In the illustrated example, the mounting means 311 are generally implemented by a planar element having an area substantially corresponding to an area of the pneumatic bladder arrangement 300 along plane XY.

The connecting means 312 can generally be understood as any mechanical element allowing connection of the mounting means 311 to one or more parts of the seat S. Preferably, the connecting means 312 connect the mounting means 311 to the headrest H and/or to one or more of the rods R. Such configuration is particularly advantageous since it allows the connecting means 312, and therefore the mounting means 311, to move with the headrest H as this is adjusted by the user. This results in a particularly advantageous positioning of the neckrest N, as the positioning of the neckrest N is automatically adjusted following a correct positioning of the headrest H. Moreover, such configuration allows the frame 310 to be adaptable to a plurality of seats S having different configurations but similar headrests H and/or rods R.

However, as discussed, the illustrated configuration is only one of many possible manners for providing a mounting frame 310 to the pneumatic bladder arrangement of the neckrest N, and various alternatives will be clear to those skilled in the art, particularly based on the consideration that the frame 310 can also be connected to, or part of, the frame of the seat S.

The mounting of the pneumatic bladder arrangement on the frame 210, 310, can be achieved in various manners. For instance, the frame 210, 310, and in particular the mounting means 311, could have a configuration holding in place the pneumatic bladder arrangement. Alternatively, or in addition, the pneumatic bladder arrangement could be attached to the frame 210, 310 through one or more attaching means, such as, for instance, glue, Velcro straps, etc. Still alternatively, or in addition, the pneumatic bladder arrangement could be held on the mounting means 311 by a trim covering at least the neckrest N.

Similarly, the connection between the various bladders, and in particular between the base inflatable bladder and one or more of the at least two side inflatable bladders could be achieved by through one or more attaching means, such as, for instance, glue, Velcro straps, etc. Still alternatively, or in addition, the connection could be achieved by bonding at least partially two neighboring flexible sheets, such as for instance sheet S2 and sheet S3, as previously described with respect to the embodiment illustrated in FIG. 9, even in those embodiments not provided with the hole H.

Figure 10:
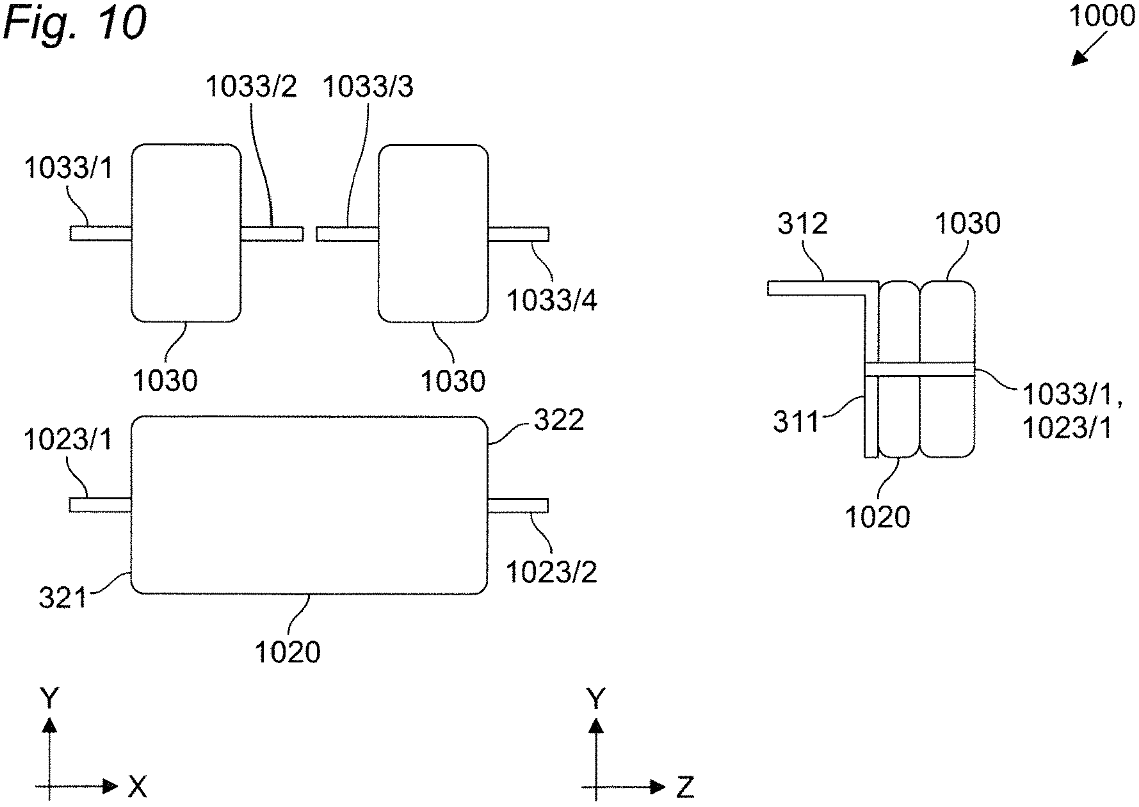

Alternatively, or in addition, as illustrated in FIG. 10, one or more among the base inflatable bladder 1020 and the at least two side inflatable bladders 1030 can comprise at least one connecting strap 1023/1-1023/2, 1033/1-1033/4 configured to connect to the frame 210, 310 of the neckrest N. Preferably, as visible in the right side of FIG. 10, the connecting strap can be connected to the mounting means 311.

In the illustrated implementation, each of the base inflatable bladder 1020 and of the two side inflatable bladders 1030 comprises two connecting straps 1023/1-1023/2, 1033/1-1033/4, connected at the ends of the respective bladder along the longitudinal axis. Thus base inflatable bladder 1020 comprises a connecting strap 1023/1 at end 321, and a connecting strap 1023/2 at end 322. Similarly, the left side inflatable bladder 1030 comprises connecting straps 1033/1 and 1033/2 while right side inflatable bladder 1030 comprises connecting straps 1033/3 and 1033/4. This configuration is particularly advantageous as the external straps 1023/1, 1033/1, 1023/2 and 1033/4 can be used to connect the respective bladders to the mounting means 311, while the internal straps 1033/2 and 1033/3 can be used to connect the side inflatable bladders 1030 to the base inflatable bladder 1020. The present invention is however not limited thereto an, in some embodiments, any number of the illustrated straps can be implemented, with the respective advantages.

In preferred embodiments, the connecting straps can be made with the same material used for the inflatable bladders, for instance from one or more sheets of flexible material, so that the bladder and the respective connecting straps can be manufactured in a single manufacturing process.

Although the above embodiment has been described with respect to the connection of the connecting straps to a frame of the neckrest N, it will be clear that a similar implementation can be obtained for the cushion support C, by connecting the connecting straps to a frame of the seat (S) and/or to a frame of the cushion part of the seat.

Figure 12:
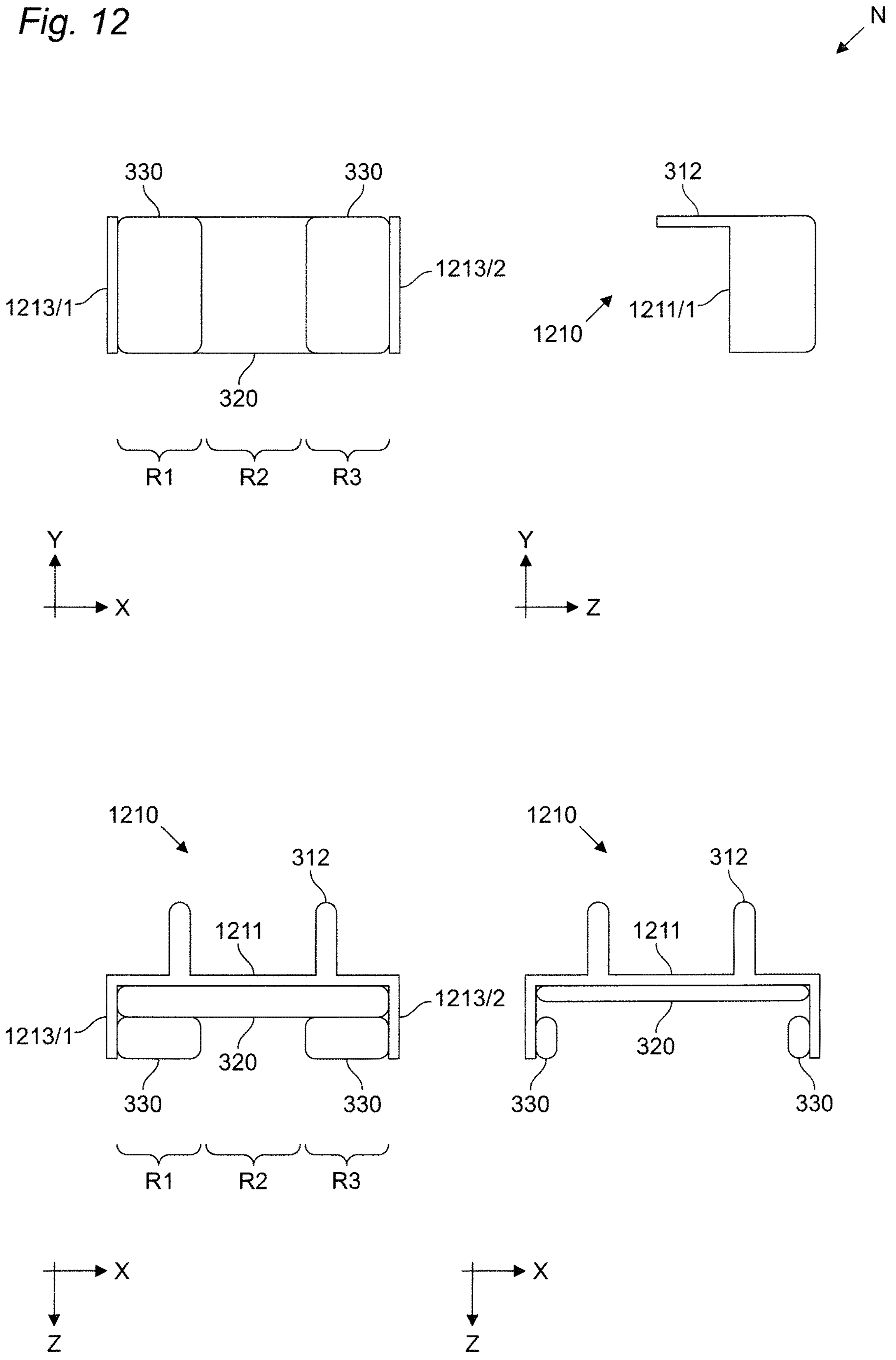

Alternatively, or in addition, as illustrated in FIG. 12, the frame 1210 can comprises base mounting means 1211 for connection to the base inflatable bladder 320, and at least two side mounting means 1213/1, 1213/2 for respective connection to the at least two side inflatable bladders 330.

Preferably the base mounting means 1211 is connected to the connecting means 312 and the and at least two side mounting means 1213/1, 1213/2 are connected to the base mounting means 1211. Alternatively, or in addition, the at least two side mounting means 1213/1, 1213/2 could be connected to the connecting means 312 directly instead of being connected to it through the base mounting means 1211.

Preferably, the at least two side mounting means 1213/1, 1213/2 define an angle, with respect to the base mounting means 1211, comprised between 60 and 160 degrees, even more preferably between 90 and 120 degrees. In some embodiments, the connection of the side mounting means 1213/1, 1213/2 to the base mounting means 1211 and/or to the connecting means 312 can also allow the angle between the side mounting means 1213/1, 1213/2 and the base mounting means 1211 to be varied, for instance by providing a hinge mounting. This allows an increased configuration of the neckrest N.

One advantage of the embodiment of FIG. 12, visible when comparing the substantially inflated state on the bottom left with the substantially deflated state on the bottom right, is that the inflation of the side inflatable bladders 330 allows both their thickness in the Z direction and their length in the X direction to be controlled. In other words, the size of the regions R1, R2 and R3 can be advantageously controlled. Moreover, this implementation increases the lateral support provided by the side inflatable bladders 330 since their movement is contained by the side mounting means 1213/1, 1213/2.

In the following, more details will be described with respect to the pneumatic bladder arrangement of the neckrest N. It will be clear that any of the pneumatic bladder arrangements will be combinable with any of the described frames.

As can be seen in FIG. 2, and better visible in the enlarged views of FIG. 3A, the pneumatic bladder arrangement 200, 300 for a neckrest N of a seat S comprises a base inflatable bladder 320 having a shape mainly elongated along a longitudinal axis.

In the drawings, this corresponds to the X direction. When mounted, the longitudinal axis is substantially perpendicular to the vertical direction of the backrest B.

Figure 4:
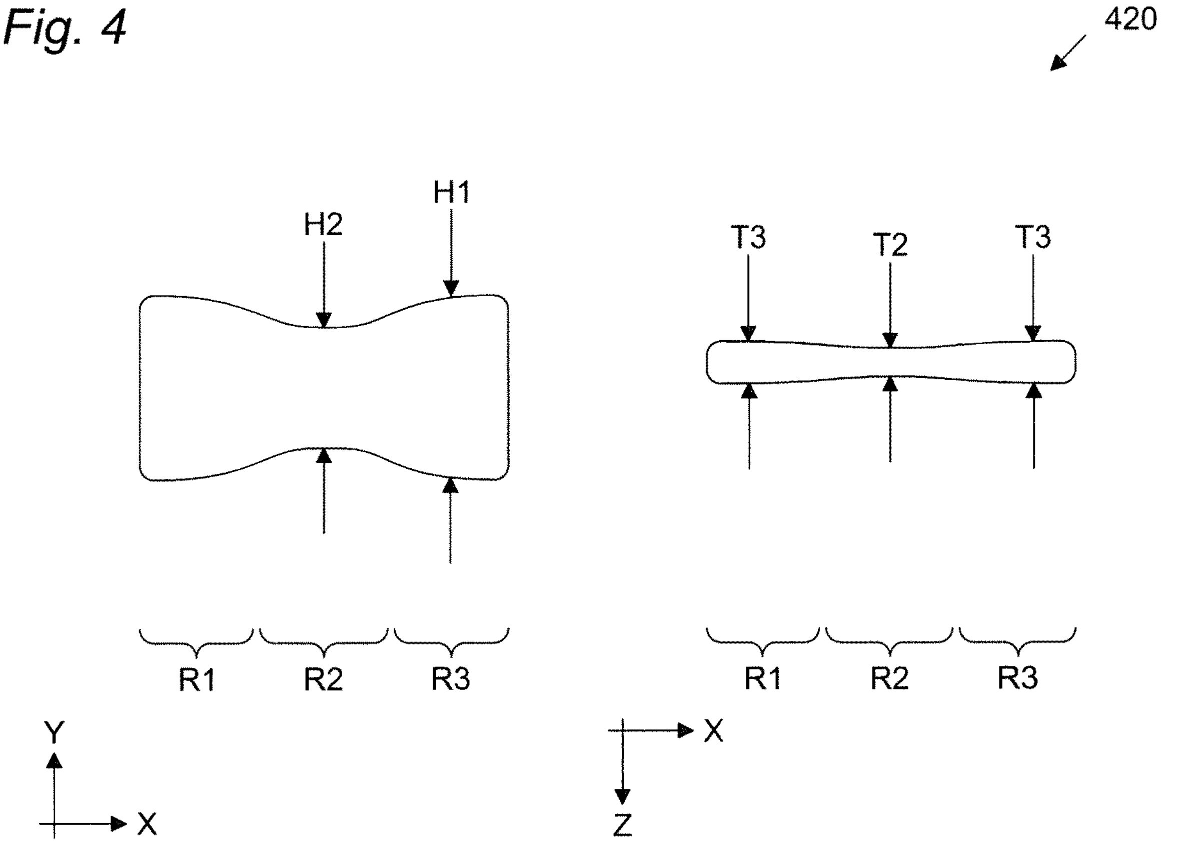

In some embodiments, the base inflatable bladder 320 preferably has a substantially rectangular shape, with the longer side of the rectangle being parallel to the longitudinal axis. The invention is however not limited thereto and other shapes, for instance as illustrated in FIG. 4, will be possible.

The base inflatable bladder 320 provides a base thickness regulation for the pneumatic bladder arrangement and thus for the neckrest N. Throughout the description, the term thickness refers to the measurement in the inflation direction of the pneumatic bladder arrangement, corresponding to direction Z in the figures. This is also the direction separating the neckrest N from the neck of a user, so that an increased thickness allows the neckrest N to be closer to the neck of the user, conversely a decreased thickness results in the distance between neck and neckrest N to increase. The base inflatable bladder 320 thus forms a first regulation of the neckrest N.

In addition, or alternatively, to regulating the distance between the neckrest N and the neck, the base inflatable bladder 320 also regulates the pressure exerted by the neckrest on the neck N. For instance, in some embodiments, the distance between the neckrest N and the neck could be regulated by a frame 310 allowing to control the positioning of the mounting means 311 with respect to the seat S. In this case, the distance between neck and neckrest could at least partially be regulated through the frame 310, while the inflation or deflation of the base inflatable bladder 320 could at least partially be used to control the pressure exerted by the neckrest N on the neck.

Figure 3B:
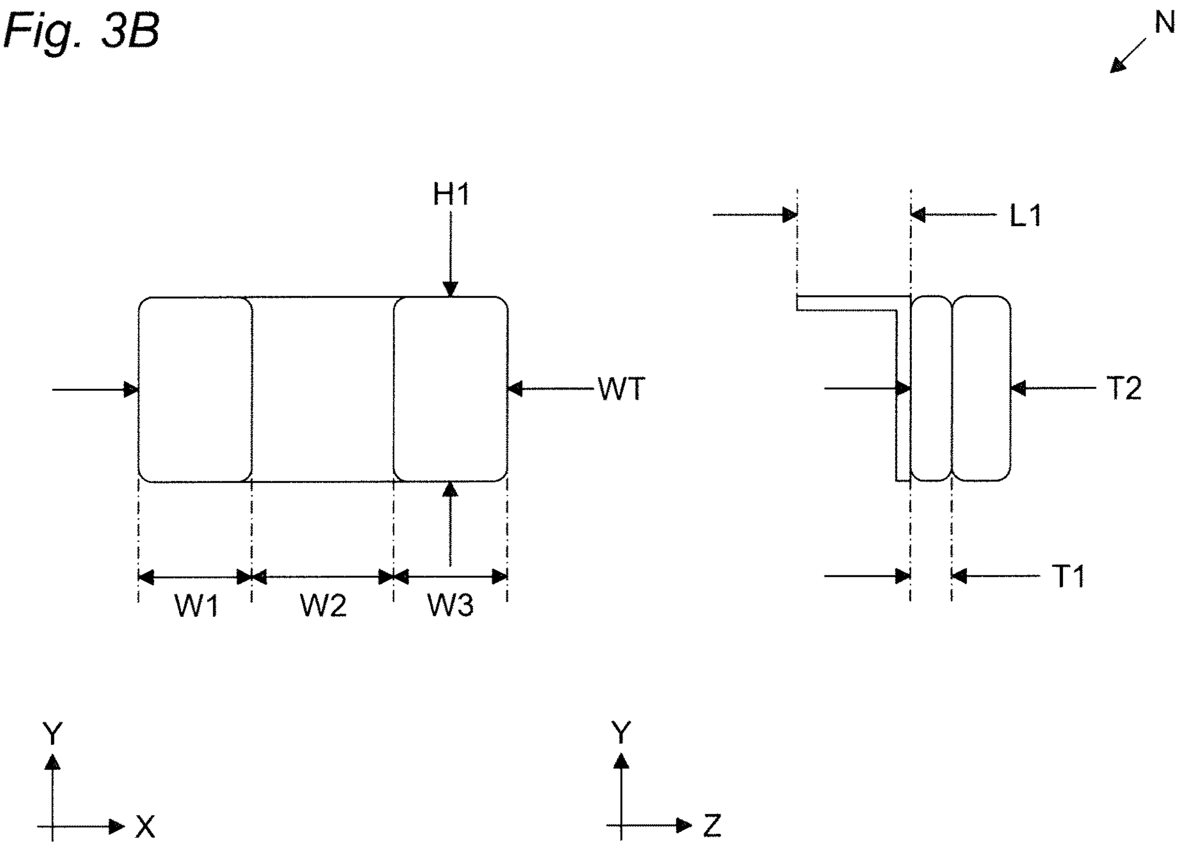

As visible in FIG. 3B, in some embodiments the connecting means 312 might have a length L1. Preferably, the length L1 is comprised between 5 and 20 cm. In some embodiments, the length L1 might be adjusted by implementing length adjustment means in the connecting means 312, for instance by implementing the connecting means 312 in a telescopic manner, via pneumatic, manual- or electromechanical actuation. Preferably the amount of adjustment is comprised between 0 mm and 100 mm, even more preferably between 10 mm and 50 mm.

Since the base inflatable bladder 320 is placed in between the neck and the frame 310, it also serves as a safety device, in particular in case of rear impact of the vehicle in which the seat S is mounted, by absorbing at least part of the impact energy before the neck comes into contact with the frame 310.

The pneumatic bladder arrangement 200, 300 further comprises at least two side inflatable bladders 330 partially overlapping the base inflatable bladder 320 and positioned so that end regions R1, R3 of the base inflatable bladder 320 are covered by the side inflatable bladders 330 while a central region R2 of the base inflatable bladder 320 is not covered by the side inflatable bladders 330. in preferred embodiments, the number of side inflatable bladders 330 can be equal to two.

Each of the side inflatable bladders 330 preferably has an area lower than the area of the base inflatable bladder 320. Even more preferably, the combined area of the side inflatable bladders 330 is lower than the area of the base inflatable bladder 320, the difference in area at least partially resulting in the central region R2 of the base inflatable bladder 320 not being covered with the side inflatable bladders 330.

The two end regions R1, R3, are preferably separated by the central region R2. The end region R1 is close to a first end 321 of the base inflatable bladder along the longitudinal axis thereof. Preferably, the region R1 is closer than the central region R2 to the first end 321. Similarly, the end region R3 is close to a second end 322 of the base inflatable bladder along the longitudinal axis thereof, the second end 322 being opposite to the first end along the longitudinal direction. Preferably, the region R3 is closer than the central region R2 to the second end 322.

While in the illustrated embodiment the side inflatable bladders 330 have an edge toward the ends 321, 322, substantially overlapping with the respective ends of the base inflatable bladder 320, the present invention is not limited thereto and, in some embodiments, the side inflatable bladders 330 and the base inflatable bladder 320 might terminate at different positions along the X axis.

Similarly, while in the illustrated embodiment the side inflatable bladders 330 have their ends, in in the Y direction, substantially overlapping with the respective ends of the base inflatable bladder 320, the present invention is not limited thereto and, in some embodiments, the side inflatable bladders 330 and the base inflatable bladder 320 might terminate at different positions along the Y axis, on the bottom and/or on the top of the neckrest N.

As best visible in the bottom right corner of FIG. 3A, in some embodiments, when inflated, a first thickness T1 of the pneumatic bladder arrangement 200, 300 at the end regions R1, R3 can be thicker than a second thickness T2 of the pneumatic bladder arrangement 200, 300 at the central region R2.

Thanks to this difference in thickness, the side inflatable bladders 330 can provide side support for the neck, which can thus be positioned at least partially in between the side inflatable bladders 330, in the central region R2. In this manner, the side inflatable bladders 330 increase comfort of the neckrest N as well as providing an additional safety hold of the neck and thus head in case of a side impact.

Additionally, since the side inflatable bladders 330 can be implemented separately from the base inflatable bladder 320, the inflation amount of the side inflatable bladders 330 and of the base inflatable bladder 320 can be, in some embodiments, controlled independently, so that a high level of configurability can be achieved for the neckrest N to adapt to the body shape and preferences of a wide arrays of users. In other words, the difference between T1 and T2 can be controlled by controlling the inflation level of the side inflatable bladders 330.

In some implementations, the first thickness T1 can be comprised between 50 mm and 200 mm preferably between 70 mm and 140 mm. Similarly, in some implementations, the second thickness T2 can be comprised between 30 mm and 120 mm, preferably between 50 mm and 70 mm. The inventors have found that those values allow a sufficient range of configurability for most users, while limiting the use of material needed to the neckrest N.

As best visible in FIG. 3B, in some implementation the base inflatable bladder 320 can have a width WT along the longitudinal axis, direction X in the figure, comprised between 100 mm and 400 mm, preferably between 200 mm and 300 mm. This, in some embodiments, can also correspond to the width, in the mounted position, of the neckrest N. Alternatively, or in addition, in some embodiments, each of the end regions R1, R3 can a width W1, W3 along the longitudinal axis, direction X in the figure, comprised between 0 mm and 150 mm, preferably between 40 mm and 100 mm.

Further alternatively, or in addition, in some embodiments, the central region R2 can have a width W2 along the longitudinal axis, direction X in the figure, equal to WT−(W1+W3) or, particularly in the embodiments in which the ends of the bladders along the X direction are not superimposed, comprised between 50 mm and 200 mm, preferably between 80 mm and 130 mm. The inventors have found that those values allow a sufficient size for comfortably accommodating the neck of most users, while limiting the overall size of the neckrest N.

As visible in FIG. 3B, in some preferred implementations, the base inflatable bladder 420 has a first height H1, measured perpendicularly to the longitudinal axis, thus along direction Y in the figure. In some implementation, such as illustrated in FIG. 3B, the side inflatable bladders 330 might also have a height corresponding to H1, although the invention is not limited thereto. Preferably, the first height H1 is comprised between 50 mm and 200 mm, preferably between 70 mm and 150 mm.

The present invention is however not limited to a configuration having a constant height H1. For instance, as visible in FIG. 4, in some preferred implementations, the base inflatable bladder 420 can have a first height H1, measured perpendicularly to the longitudinal axis, thus along direction Y in the figure substantially in correspondence with the end regions R1, R3, and a second height H2, perpendicular to the longitudinal axis X in correspondence with the central region R2. Preferably, the first height H1 can be bigger than the second height H2.

Thanks to this arrangement, as best seen in the right part of FIG. 4, the difference in heights H1, H2 also has an impact in terms of thickness of the base inflatable bladder 420. In particular, a lower height generally also results in a lower thickness, due to geometric considerations. As the height H2 in the central region is lower than the height H1 in the end regions R1, R3, this also results in a thickness T2 in the central region being lower than a thickness T3 in the end regions. This results in a shape which better fits the natural shape of a neck and also contributes toward the difference in thickness between the end regions R1, R3 and the central region R2, previously described.

Preferably, in some implementations, the second height H2 can be comprised between 40 mm and 180 mm, preferably between 50 mm and 120 mm.

In some preferred embodiments, such as visible in FIG. 4, the height of the base inflatable bladder 420 along the entire end regions R1, R3, is higher than the height of the base inflatable bladder 420 along the entire central region R2. Preferably, the height change between the end regions R and the central region R2 is monotonic and even more preferably gradual. The same considerations can apply to the height change between the end region R3 and the central region R2.

In the embodiments described above, the side inflatable bladders 330 have a substantially quadrangular, preferably rectangular, shape, for instance with height H1 and width W1, W3. The present invention is however not limited thereto.

Figure 5:
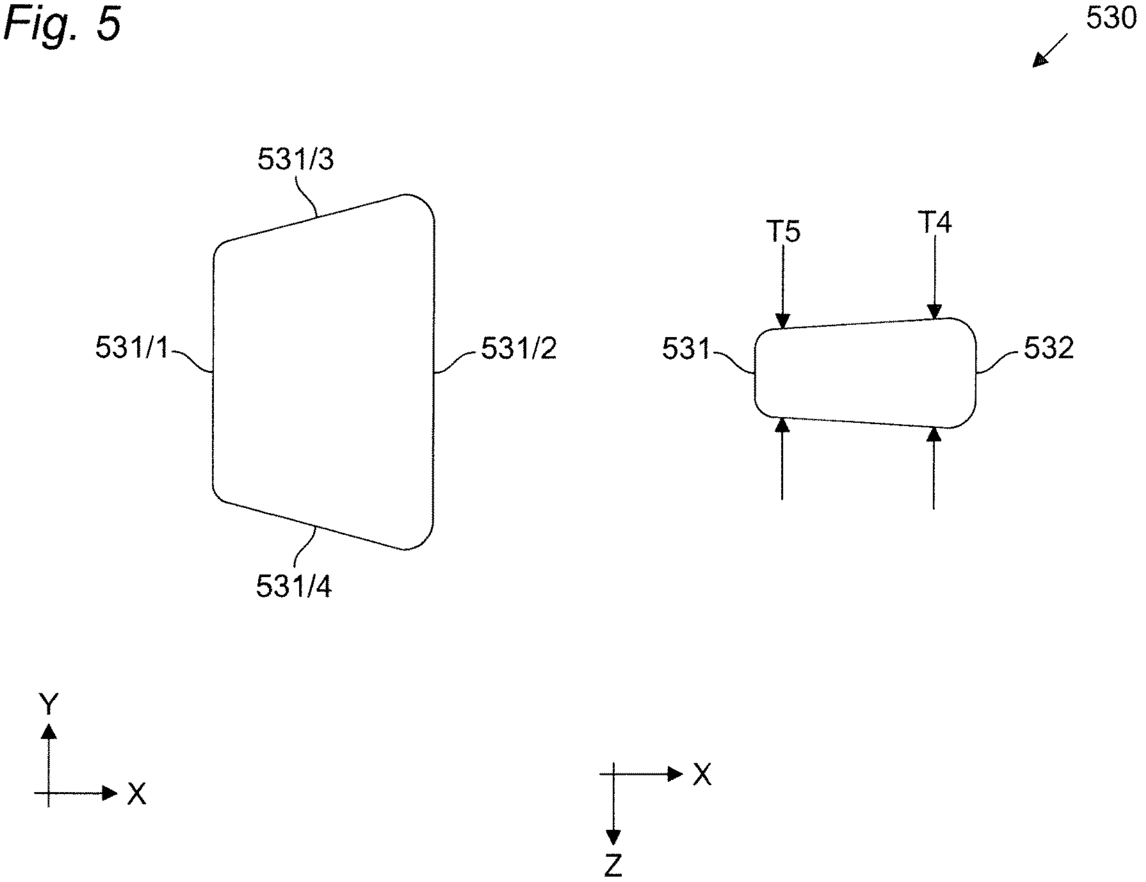

In particular, in some embodiments, as can be seen in FIG. 5, at least one of, preferably both of, the side inflatable bladders 530 can have a substantially trapezoidal shape. In other words, in some embodiments, at least one of, preferably both of, the side inflatable bladders 530 can have two substantially parallel edges 531/1, 531/2, comprising a shorter edge 531/1 and a longer edge 531/2. The shorter edge 531/1 is preferably closer to the central region R2 than the longer edge 531/2. In other words, non-parallel edges 531/3 and 532/4 can converge toward each other in a direction toward the central region R2.

This configuration has the advantage that, as the height in the Y direction of the side inflatable bladder 530 increases toward the exterior of the neckrest N, so does the thickness of the side inflatable bladder 530, as can be seen in the right side of FIG. 4, increasing from thickness T4 toward thickness T5. Preferably the increase in height of the side inflatable bladder 530 is monotonic and gradual, resulting in a similar increase in thickness. This configuration provides a lateral support which has a thickness increasing when moving away from the region R2, which is anatomically preferable, as it follows the shape of the neck.

Figure 6:
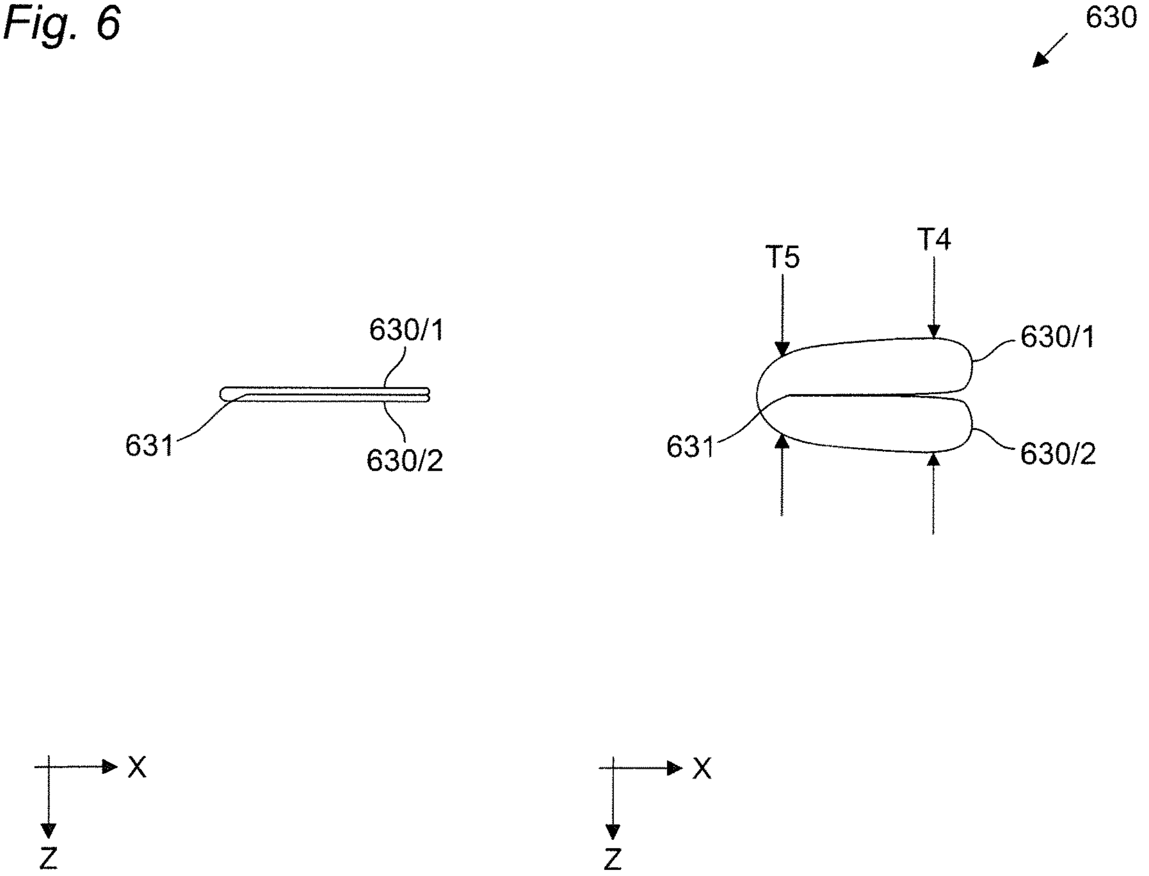

Alternatively, or in addition, a similar advantage can be obtained by the side inflatable bladder 630 illustrated in FIG. 6. In particular, in some embodiments, at least one of, preferably both of, the side inflatable bladders 630 can be folded at a folding line 631 in two substantially overlapping portions 630/1, 630/2, so as to form a U-shape. Preferably, the folding line 631 can be substantially perpendicular to the longitudinal axis of the base inflatable bladder 320, 420. Preferably, the central region R2 can be closer to the folding line 631 than to an open side of the U-shape. In this last configuration, the open side of the U-shape, namely the side of the side inflatable bladder 630 is thus oriented toward the exterior of the neckrest N.

Thanks to this arrangement, as can particularly be seen in the right part of FIG. 6, the same advantages already discussed for side inflatable bladder 530 can be obtained, namely the thickness of the side inflatable bladder 630 can increase when moving away from the region R2 thus resulting in an anatomically better conformed shape of the neckrest N.

In the embodiments described above, no specific connections to the various bladders has been described. Those skilled in the art will know that inflatable bladders can be connected, for instance through pipes and valves, to a pump so as to inflate and/or deflate the bladder. One exemplary embodiment for this approach is illustrated in FIG. 7.

The pneumatic bladder arrangement 700 differs from the previously described pneumatic bladder arrangements by further comprising at least one fluid supply connection 722, 732 for inflating and/or deflating the base inflatable bladder 720 and/or the at least two side inflatable bladders 730. In the illustrated embodiment, each of the side inflatable bladders 730 and the base inflatable bladder 720 is provided with a fluid supply connection 732, 722. In the illustrated embodiment, the fluid supply connections 722, 732 are routed from the top of the pneumatic bladder arrangement 700, when mounted, toward the rods R and through the backrest B. This implementation has the advantage that the fluid supply connections 722, 732 have little interference with the seat occupant, the present invention is however not limited thereto and alternative routings will be possible.

Figure 7:
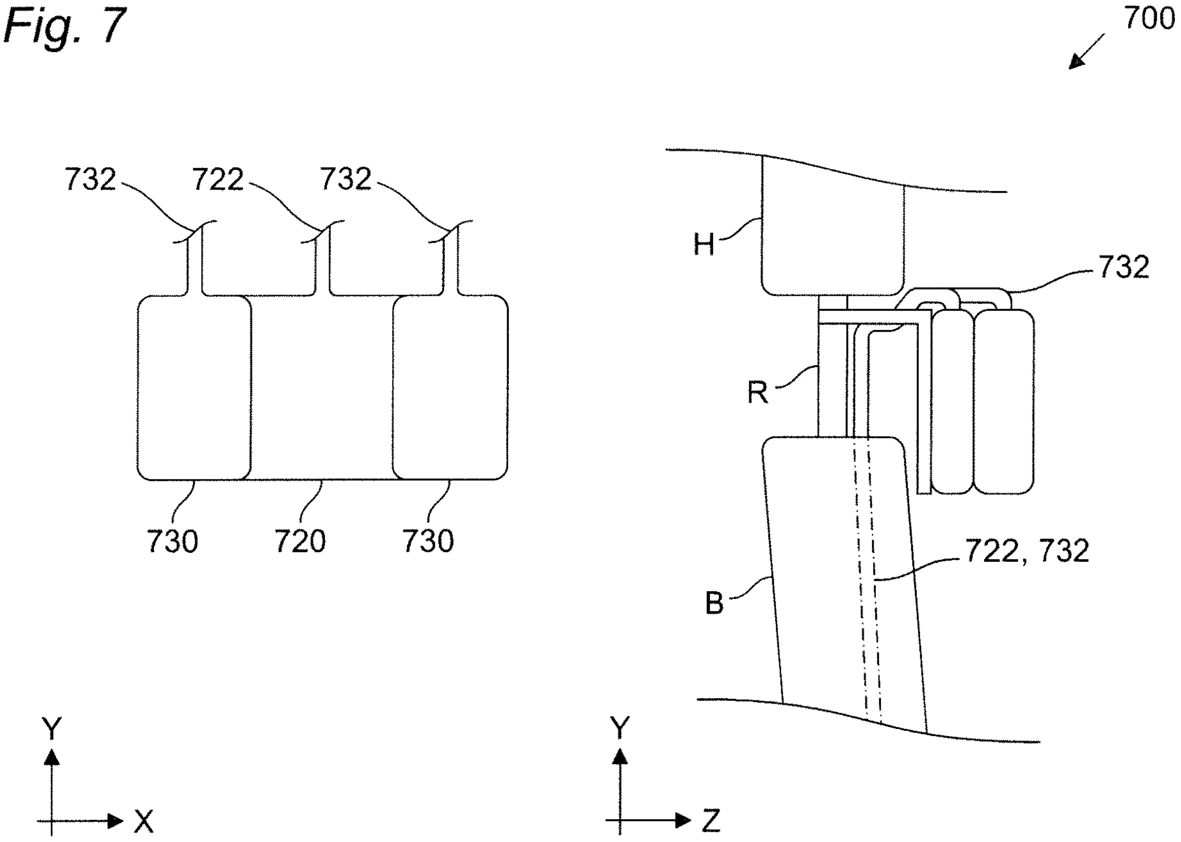

The implementation illustrated in FIG. 7 has the advantage that each bladder of the pneumatic bladder arrangement can be independently controlled. This provides the user with the highest possible degree of configuration.

Figure 8:
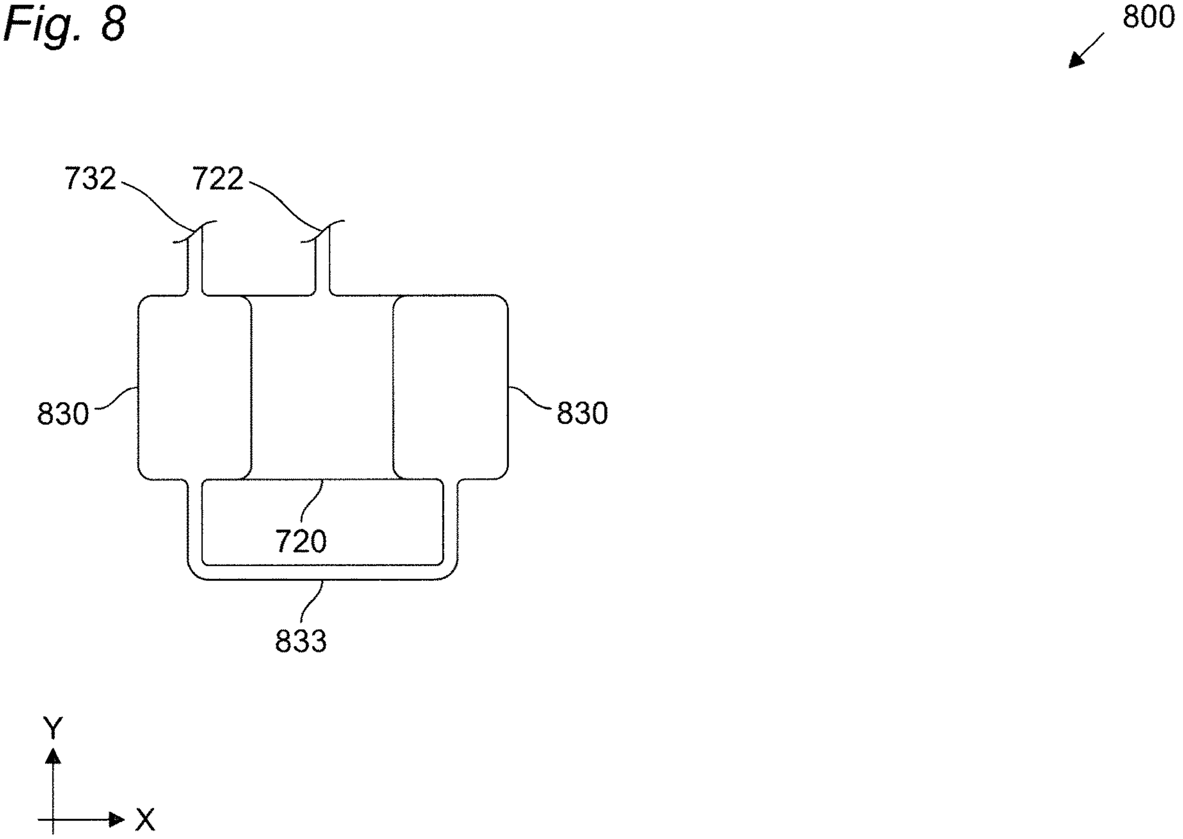

FIG. 8 schematically illustrates an implementation in which the pneumatic bladder arrangement 800 further comprises at least one fluid supply interconnection 833 for connecting at least two between the base inflatable bladder 720 and any of the at least two side inflatable bladders 830. In the illustrated embodiment, the fluid supply interconnection 833 connects the two side inflatable bladders 830 to each other, providing a fluid interconnection between them.

This approach has the advantage that the number of fluid supply connections 722, 732 can be reduced, thus lowering the manufacturing and mounting complexity and costs. At the same time, the lack of independent control of the two side inflatable bladders 830 is not a drawback, in most practical applications, as most users will prefer a symmetrical operation of the two side inflatable bladders 830.

While the fluid supply interconnection 833 is illustrated as being provided below the pneumatic bladder arrangement, in the vertical direction, when mounted, the placement of the fluid supply interconnection 833 is not limited thereto. Alternative routings of the fluid supply interconnection 833 will be possible.

Figure 9:
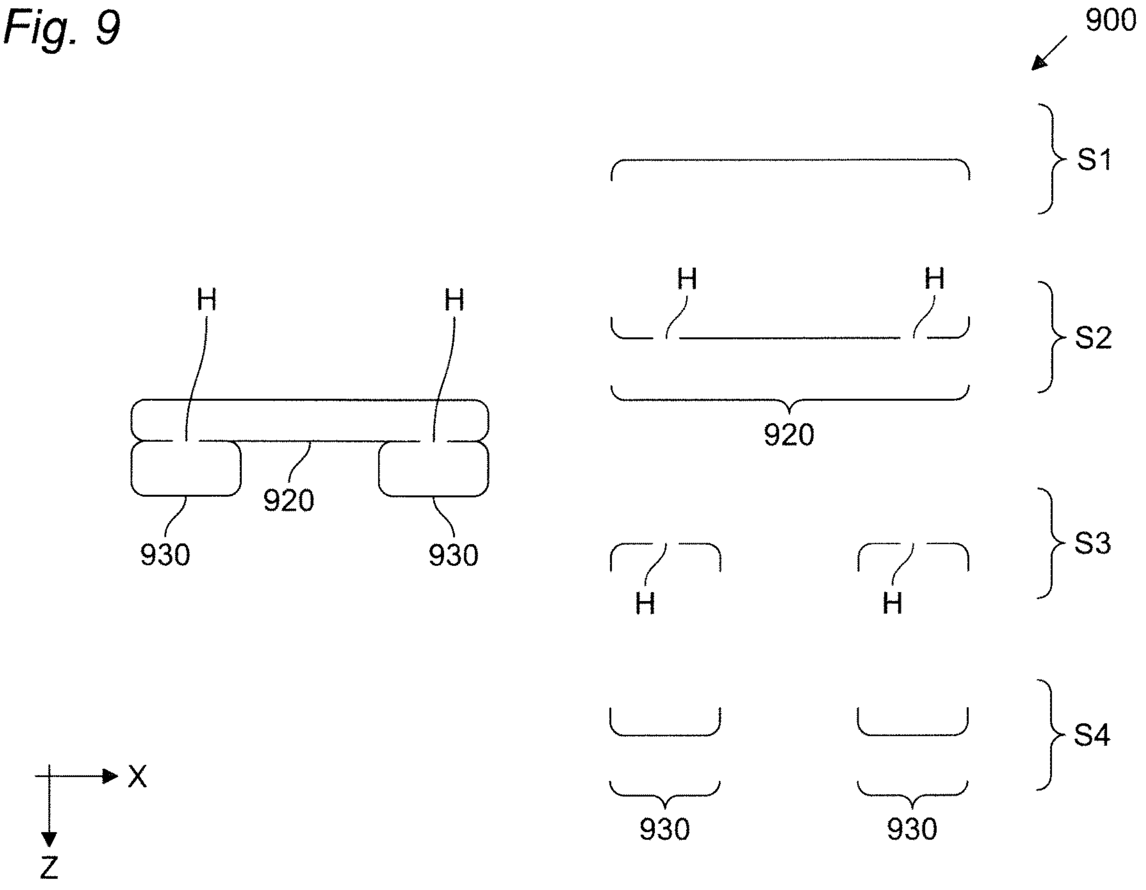

FIG. 9 schematically illustrates a further approach for a pneumatic bladder arrangement 900. In some embodiments, the base inflatable bladder 920 can comprise at least one hole H for connecting to at least one of the at least two side inflatable bladders 930. In the illustrated implementation, the base inflatable bladder 920 comprises two such holes H, respectively connecting the base inflatable bladder 920 to the at least two side inflatable bladders 920. This approach has the advantage that the number of fluid supply connections 722, 732 can be further reduced.

In some embodiments, as visible in the right part of FIG. 9, the base inflatable bladder 920 can comprise at least two first sheets of flexible material S1, S2, and the at least two side inflatable bladders 930 can each comprise at least two second sheets of flexible material S3, S4. The bladders can be implemented by bonding of the sheets of flexible material in a known manner.

To implement the hole H, one of the first sheets of flexible material S1, S2 can comprise the hole H, in the illustrated embodiment this being sheet S2. Similarly, one of the second sheets of flexible material S3, S4 can also comprise the hole H, in the illustrated embodiment this being sheet S3. By bonding the perimeter of the hole H in the sheets S2 and S3, it is thus possible to implement the hole between the bladders 920, 930 and, at the same time, mechanically connect those bladders to each other, which facilitates assembling of the pneumatic bladder arrangement in the seat S.

In the above embodiments various shapes have been described for the bladders and in particular for the side inflatable bladders, such as rectangular and trapezoidal shapes. In some embodiments, the side inflatable bladders could also have a substantially circular shape. Preferably, when this shape is combined with the embodiment illustrated in FIG. 9, the substantially circular shape could be substantially centred on the hole H. This is particularly advantageous since it allows a simplified manufacturing, in that once the alignment of the hole H is correct there is no need for further alignment of the side inflatable bladders, thanks to their circular symmetry around hole H.

It has thus been described how a pneumatic bladder arrangement can be manufactured and/or structured so as to be used in a neckrest N of a seat S. As indicated, any of the above features can also be applied to a cushion support C.

Figure 11A:
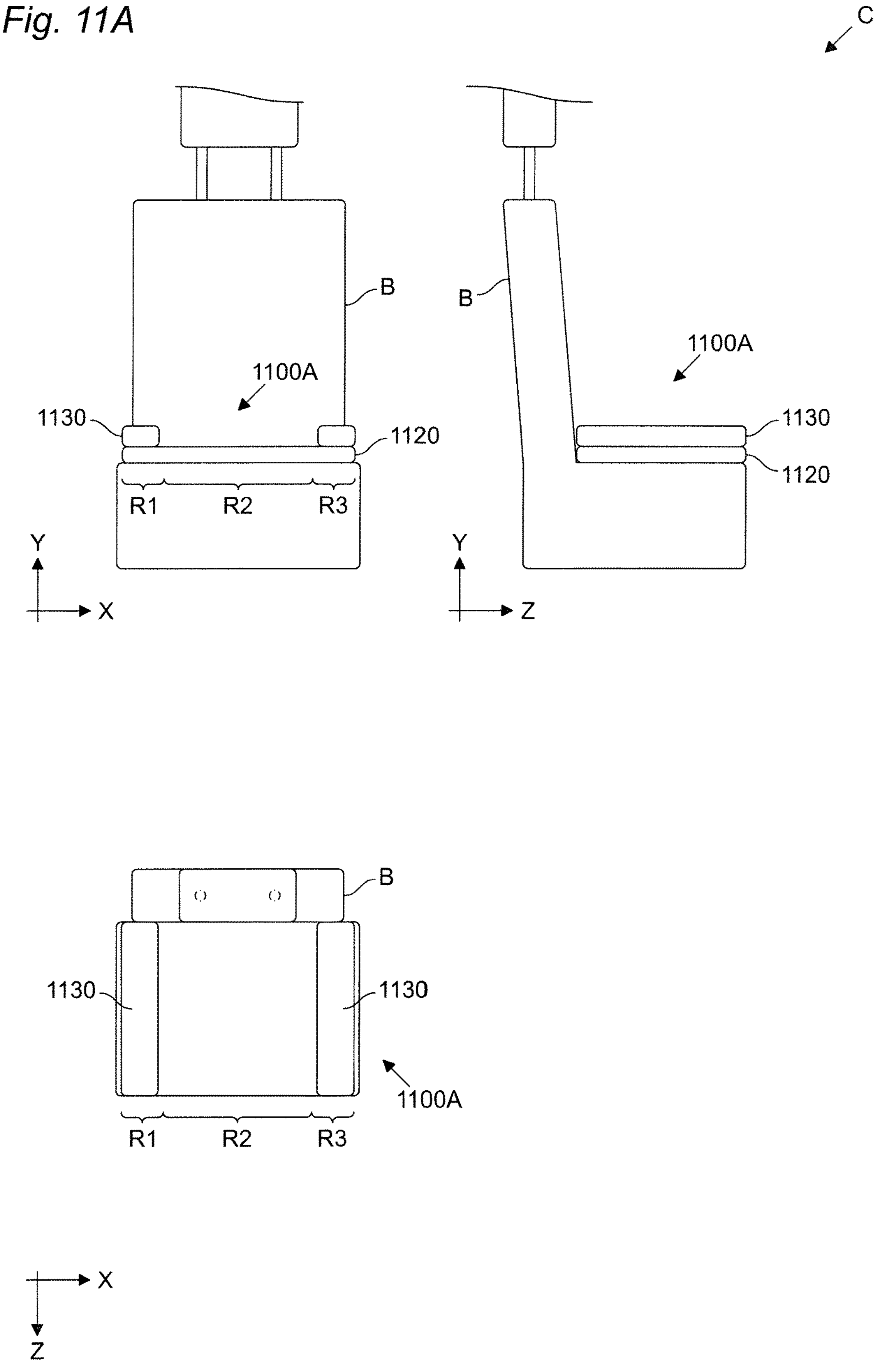

As an example, FIG. 11A schematically illustrates a front, side and top view of a seat S comprising a cushion support C in a substantially inflated configuration. as it can be seen, also in this case, the base inflatable bladder 1120 has a region R2 in which it is not covered by the at least two side inflatable bladders 1130, which are placed substantially on the two extremities of the base inflatable bladder 1120.

Depending on the dimensions of the side inflatable bladders 1130, those can be used as configurable lower support for the thighs and/or as a massage area for the thighs. Alternatively, or in addition, the side inflatable bladders 1130 can be used as lateral support for the thighs and/or as a side massage area for the thighs. It will be clear that the specific configuration of the pneumatic bladder arrangements 1100A can comprise any of the previously described configurations.

Figure 11B:
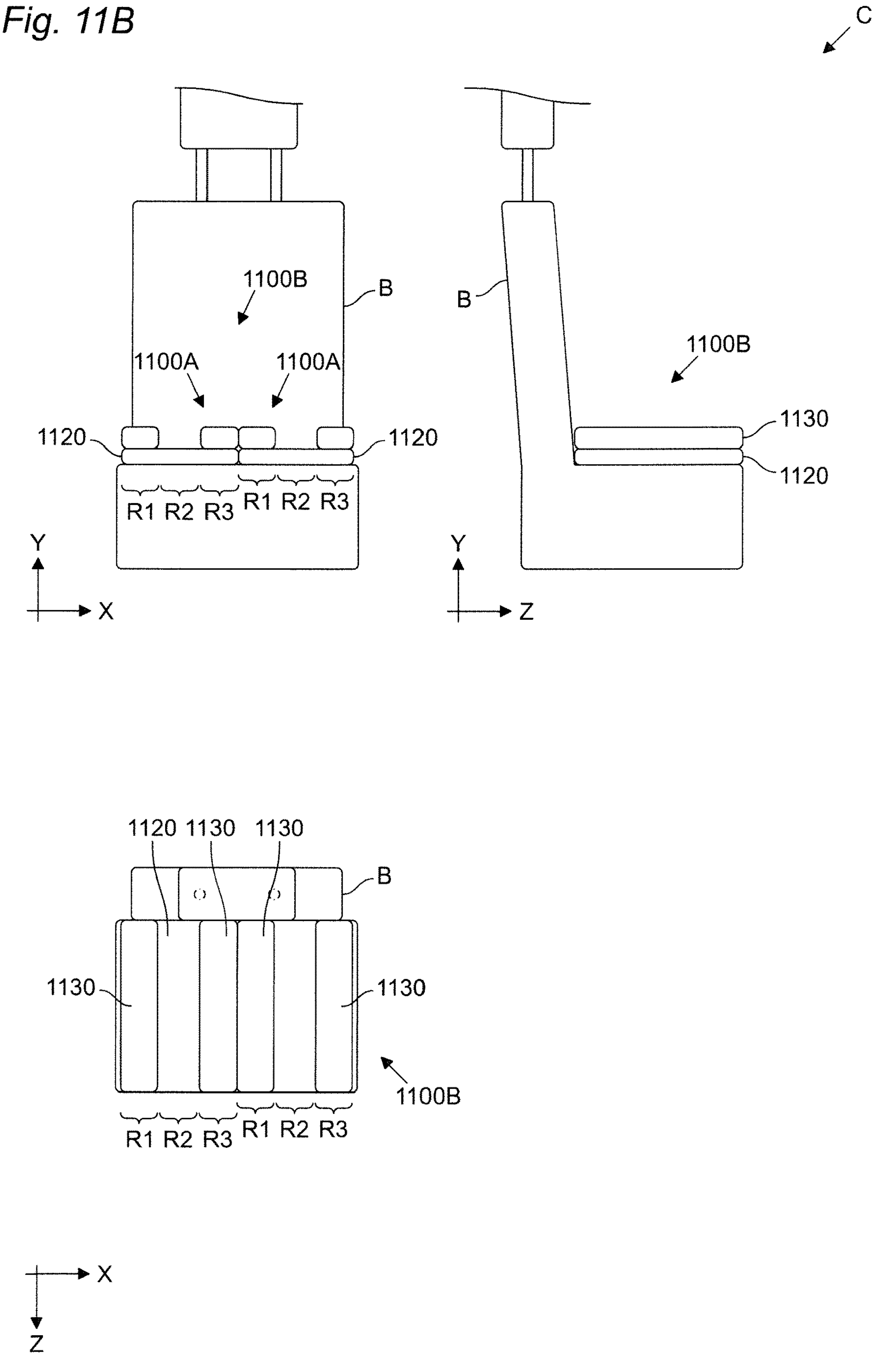

FIG. 11B illustrates a further possible implementation, in which the seat S has a cushion support C comprising at least two, and preferably two, pneumatic bladder arrangements 1100A, indicated together as pneumatic bladder arrangements 1100B, one for each leg. Also in this case, the two pneumatic bladder arrangements 1100A can be implemented in any previously described manner.

One advantage of providing a pneumatic bladder arrangements 1100B comprising two such pneumatic bladder arrangements 1100A is that support and/or massage can be provided on both sides of each leg.

Figure 11C:
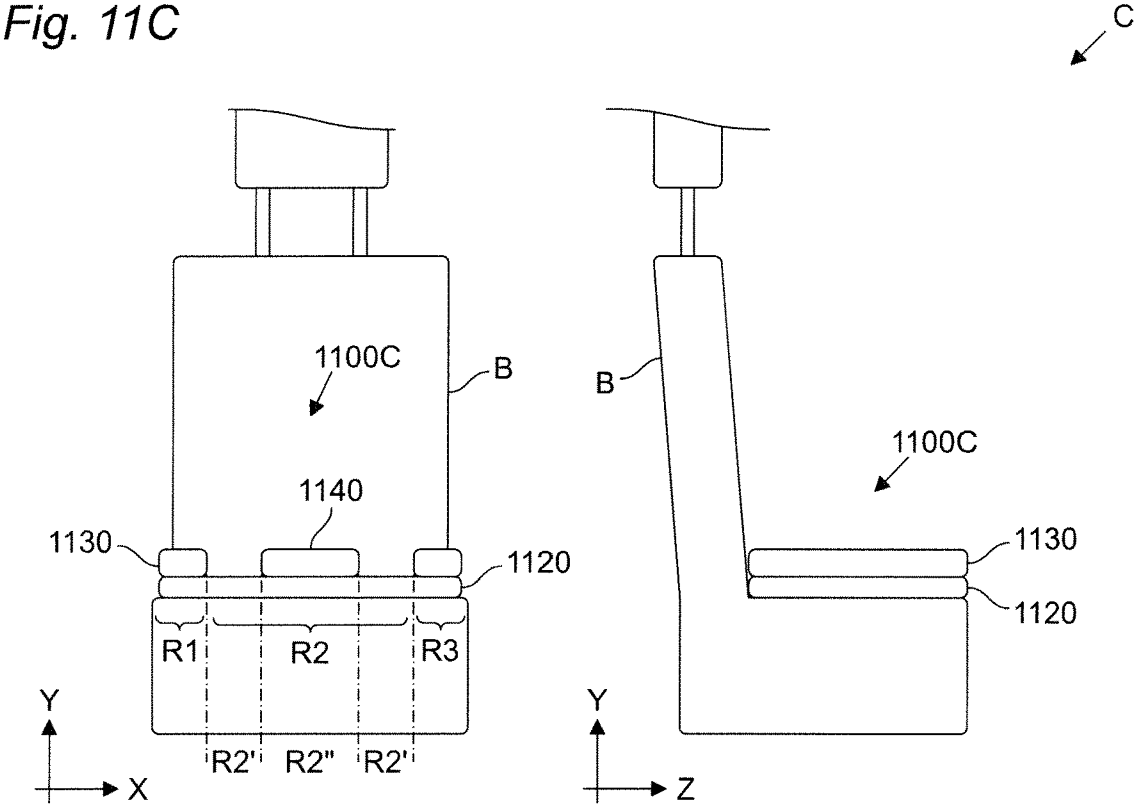
Figure 11C:
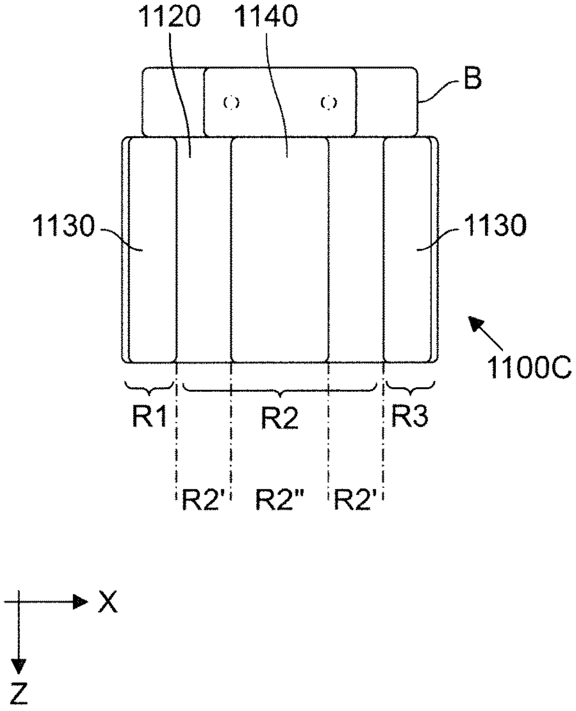

FIG. 11C illustrates a similar configuration to FIG. 11B, wherein the two base inflatable bladders 1120 and the two central side inflatable bladders 1130 can be understood as being joined together. This implementation can be advantageous in reducing the costs of the configuration of FIG. 11B while providing similar advantages.

This results in a pneumatic bladder arrangement 1100C comprising a single base inflatable bladder 1120 and two side inflatable bladders 1130, as previously described, for which any of the previous configurations for a pneumatic bladder arrangement can be implemented. In addition, the central region comprises a first part R2' and a second part R2". The first part R2' can be configured with any of the characteristics previously described for the second region R2. On the other hand, the second part R2" can be provided with an additional central inflatable bladder 1140. The central inflatable bladder can be implemented with any of the characteristics previously described for the side inflatable bladders 1130. Preferably, the central inflatable bladder 1140 can be positioned substantially in the middle of the two side inflatable bladder 1130, along the X direction. In some embodiments, this results in the central region R2 comprising a first part R2', a second part R2" and a first part R2, in the X direction, with the two first parts R2' having a substantially similar dimension in the X direction.

Preferably, in some embodiments, each of the first parts R2' has a larger dimension along the X direction than the second part R2". Alternatively, on in addition, in some embodiments the second part R2" of the second region has a dimension in the X direction which is less than 50% of the total width of the second region in the width direction, preferably less than 40%, even more preferably less than 30%.

Further preferably, in some embodiments, the central inflatable bladder 1140 can have a position and/or dimensions allowing the central inflatable bladder 1140 to be positioned in between the legs of a user sitting on the seat S. The central inflatable bladder 1140 can be further configured to be inflated such that it comes into contact with the internal side of both legs of the user.

Figure 13A:
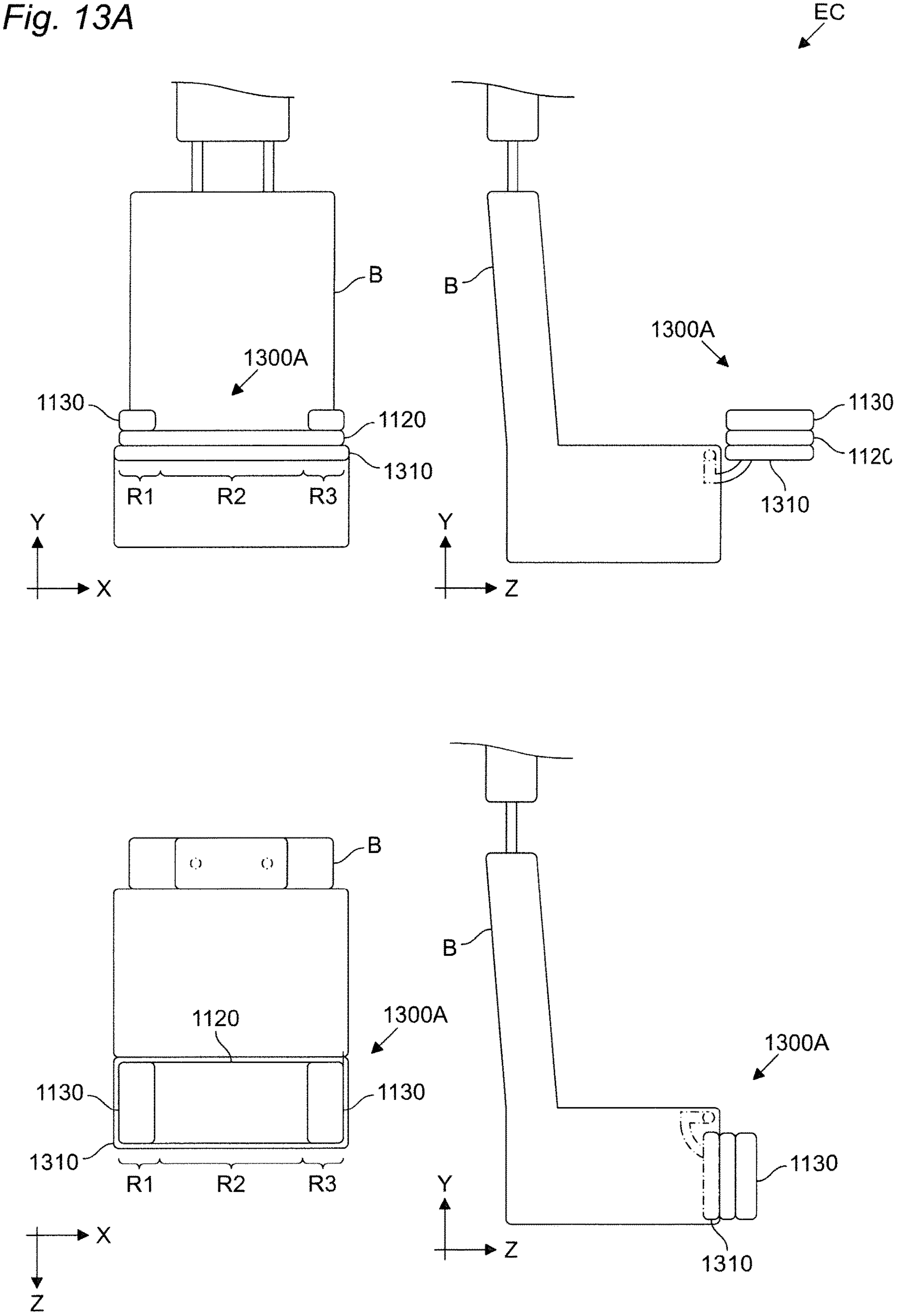
Figure 13B:
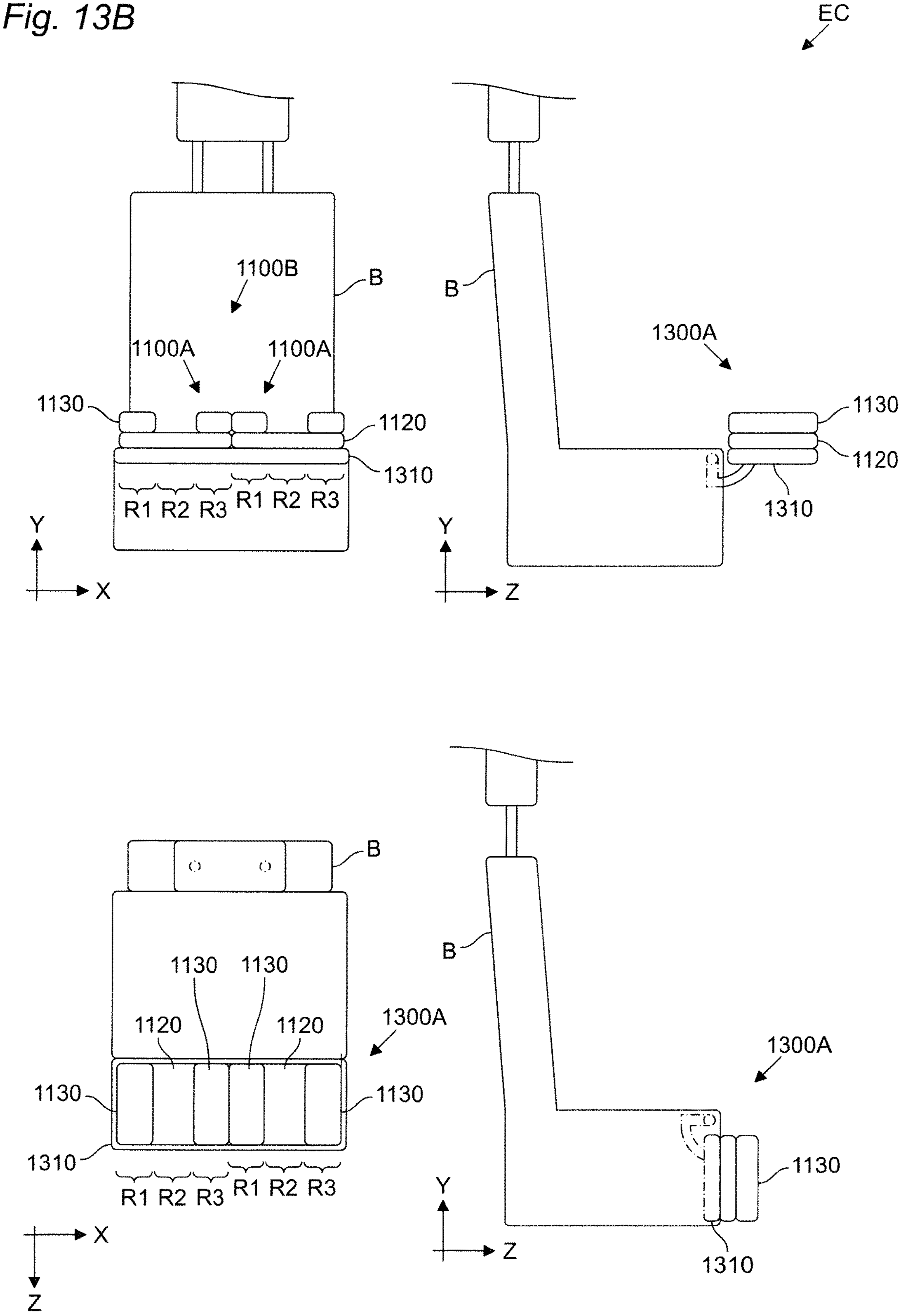
Figure 13C:
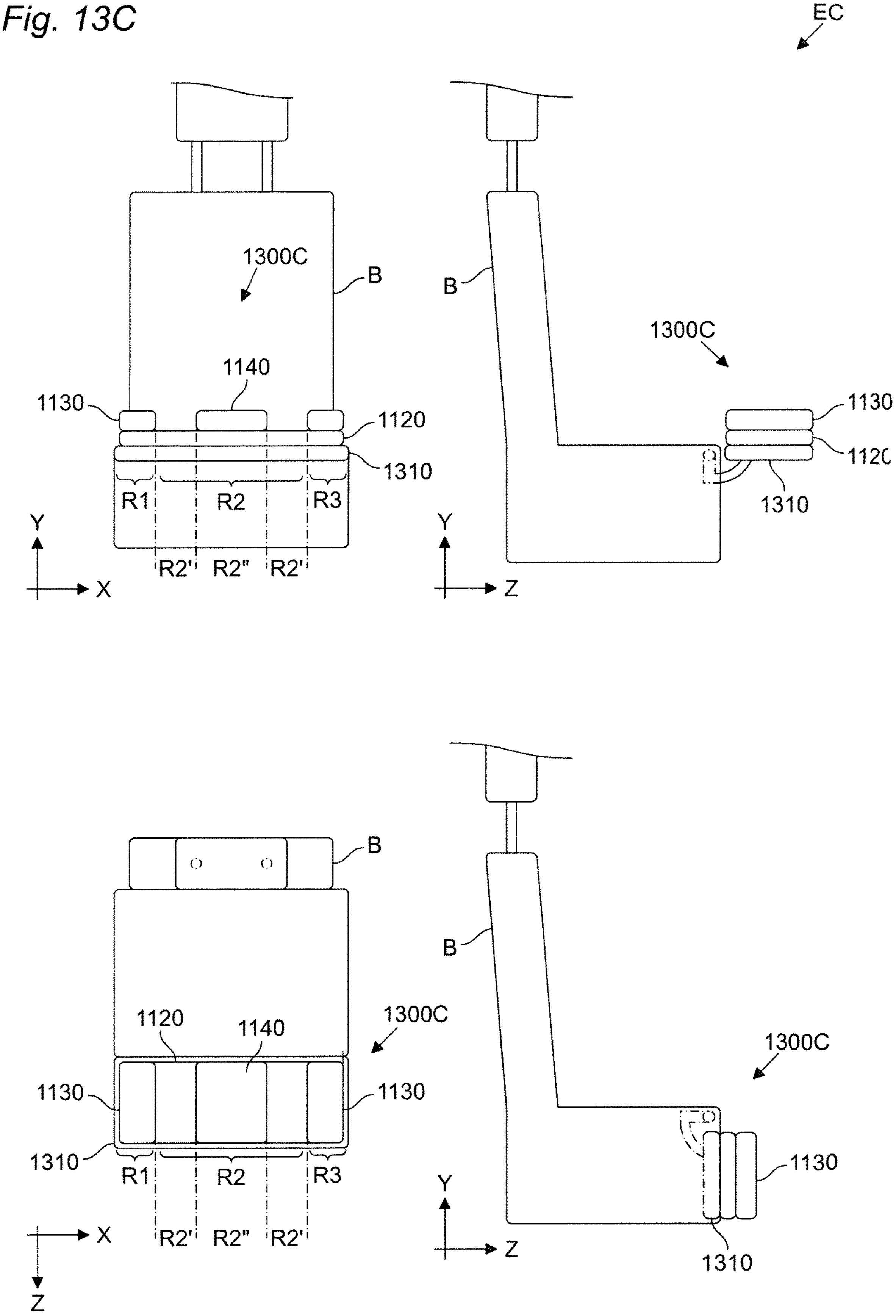

FIG. 13A illustrates an extendable cushion support EC comprising a pneumatic bladder arrangement 1300A. In the illustrated embodiment, the pneumatic bladder arrangement 1300A is substantially similar to the pneumatic bladder arrangement 1100A previously described, it will however be clear that any of the previously described pneumatic bladder arrangements can be implemented, and in particular the pneumatic bladder arrangements 1100B and 1100C, illustrated as pneumatic bladder arrangement 1300B and 1300C in FIGS. 13B and 13C respectively, The extendable cushion support EC has a functionality similar to that of the cushion support C. However, thanks to a frame 1310, preferably mounted in a pivotable manner to the seat S, the extendable cushion support EC can be positioned anywhere between a fully extended position, schematically illustrated in the top right part of FIG. 13A and a retreated position, schematically illustrated in the bottom right part of FIG. 13A.

In the figures, the frame 1310 is schematically illustrated as a substantially planar mounting means, similar to mounting means 311. It will however be clear that alternative shapes for the frame 1310 are possible, for instance as already described for frame 1210, including the side mounting means 1213/1 and 1213/2. Moreover, the frame 1310 is schematically illustrated as having a connecting means pivotally mounted to the seat, preferably at a portion of the seat S below and/or in front of the cushion. It will be however be clear that alternative arrangements are possible.

In the fully extended position, the frame 1310 is preferably substantially parallel to the cushion of the seat S and the extendable cushion support EC can thus extend the cushion in the Z direction. The previously described advantages in relation to the support and massage of the thighs can thus also be applied to the lower part of the thighs and/or to the upper part of the calves.

In the various embodiments described above, and in particular in the figures, the description has been provided of the various bladders without any additional covering layer. It will be clear that, in various practical implementations, the pneumatic bladder arrangement or at least parts thereof can be covered with one or more layers such as padding, foam, etc.

In particular, in some embodiments it will be possible to integrate electrodes on the outmost layer facing the user of one or more ore the bladders. This, for instance in connection with the embodiments implementing a neckrest where the skin of the user can be in direct contact with the neckrest, allows electrical stimulations and/or massaging to be implemented.

While various features have been described as being combined to implement given embodiments, one or more features from one or more embodiment can be combined in any manner resulting in additional embodiments, as will be clear to those skilled in the art.

LIST OF REFERENCE NUMERALS

B: backrest
H: headrest
S: seat
R: rod
200: pneumatic bladder arrangement
N: neckrest
300: pneumatic bladder arrangement
310: frame
311: mounting means
312: connecting means
320: base inflatable bladder
321: end
330: side inflatable bladder
H1: height
L1: length
T1, T2: thickness
W1, W2, W3, WT: width
420: base inflatable bladder
H1, H2: height
T3: thickness
530: side inflatable bladder
531/1, 531/2, 531/3, 531/4: edge
T4, T5: thickness
630: side inflatable bladder
700: pneumatic bladder arrangement
720: base inflatable bladder
722: fluid supply connection
730: side inflatable bladder
732: fluid supply connection
800: pneumatic bladder arrangement
830: side inflatable bladder
833: fluid supply interconnection
900: pneumatic bladder arrangement
920: base inflatable bladder
930: side inflatable bladder
S1-S4: sheet of flexible material
1000: pneumatic bladder arrangement
1020: base inflatable bladder
1023/1-1023/2: connecting strap
1030: side inflatable bladder
1033/1-1033/4: connecting strap
1100A: pneumatic bladder arrangement
1120: base inflatable bladder
1130: side inflatable bladder
C: cushion support
1100B: pneumatic bladder arrangement
1100C: pneumatic bladder arrangement
1140: central inflatable bladder
R2': first part
R2": second part
1210: frame
1211: base mounting means
1213/1, 1213/2: side mounting means
1300A: pneumatic bladder arrangement
1310: frame
EC: extendable cushion support
1300B: pneumatic bladder arrangement
1300C: pneumatic bladder arrangement

The invention claimed is:

1. A pneumatic bladder arrangement for a neck rest or cushion support of a seat comprising:
- a base inflatable bladder having a shape mainly elongated along a longitudinal axis; and
- at least two side inflatable bladders, partially overlapping the base inflatable bladder and positioned so that end regions of the base inflatable bladder are covered by the side inflatable bladders while a central region of the base inflatable bladder is not covered by the side inflatable bladders;
- wherein at least one of the side inflatable bladders is folded at a folding line in two substantially overlapping portions, so as to form a U-shape, and
- wherein the folding line is substantially perpendicular to the longitudinal axis of the base inflatable bladder.

2. The pneumatic bladder arrangement of claim 1, wherein when inflated, a first thickness of the pneumatic bladder arrangement at the end regions is thicker than a second thickness of the pneumatic bladder arrangement at the central region.

3. The pneumatic bladder arrangement of claim 2, wherein the first thickness is comprised between 70 mm and 140 mm, preferably between 30 mm and 120 mm, and wherein the second thickness is comprised between 30 mm and 120 mm, preferably between 50 mm and 70 mm.

4. The pneumatic bladder arrangement of claim 1, wherein the base inflatable bladder has a first height, perpendicular to the longitudinal axis and in correspondence with the end regions, and a second height, perpendicular to the longitudinal axis in correspondence with the central region, and wherein the first height is bigger than the second height.

5. The pneumatic bladder arrangement of claim 4, wherein the first height is between 50 mm and 200 mm, preferably between 70 mm and 150 mm, and wherein the second height is between 40 mm and 180 mm, preferably between 50 mm and 120 mm.

6. The pneumatic bladder arrangement of claim 1, wherein at least one of the side inflatable bladders has a substantially trapezoidal shape.

7. The pneumatic bladder arrangement of claim 1, wherein at least one of the side inflatable bladders has two substantially parallel edges, including a shorter edge and a longer edge, and wherein the shorter edge is closer to the central region than the longer edge.

8. The pneumatic bladder arrangement of claim 1, wherein the central region is closer to the folding line than to an open side of the U-shape.

9. The pneumatic bladder arrangement of claim 1, further including at least one fluid supply connection for inflating and/or deflating the base inflatable bladder and/or the at least two side inflatable bladders.

10. The pneumatic bladder arrangement of claim 1, further including at least one fluid supply interconnection for connecting at least two between the base inflatable bladder and any of the at least two side inflatable bladders.

11. The pneumatic bladder arrangement of claim 10, wherein the fluid supply interconnection connects the at least two side inflatable bladders to each other.

12. The pneumatic bladder arrangement of claim 1, wherein the base inflatable bladder includes at least one hole for connecting to at least one of the at least two side inflatable bladders.

13. The pneumatic bladder arrangement of claim 12, wherein the base inflatable bladder comprises at least two first sheets of flexible material, and wherein each of the at least two side inflatable bladders comprises at least two second sheets of flexible material, and wherein the hole extends through one of the first sheets of flexible material and one of the second sheets of flexible material.

14. The pneumatic bladder arrangement of claim 13, wherein the one of the first sheets of flexible material is bound to the one of the second sheets of flexible material.

15. The pneumatic bladder arrangement of claim 1, wherein one or more among the base inflatable bladder and the at least two side inflatable bladders includes at least one connecting strap configured to connect to a frame, preferably a frame of the neck rest or of the seat.

16. The pneumatic bladder arrangement of claim 1, wherein the pneumatic bladder arrangement is disposed in the cushion support of the seat.

17. The pneumatic bladder arrangement of claim 16, wherein two of the pneumatic bladder arrangements are disposed in the cushion support, and wherein the cushion support is disposed on legs of the seat.

18. The pneumatic bladder arrangement of claim 17, wherein the cushion support is pivotably mounted to the seat and is extendable.

19. A neck rest for a seat, the neck rest including:

a frame, and a pneumatic bladder arrangement mounted on the frame, the pneumatic bladder arrangement including, a base inflatable bladder having a shape mainly elongated along a longitudinal axis, and at least two side inflatable bladders, partially overlapping the base inflatable bladder and positioned so that end regions of the base inflatable bladder are covered by the side inflatable bladders while a central region of the base inflatable bladder is not covered by the side inflatable bladders, wherein at least one of the side inflatable bladders is folded at a folding line in two substantially overlapping portions, so as to form a U-shape, and wherein the folding line is substantially perpendicular to the longitudinal axis of the base inflatable bladder.

20. The neck rest of claim 19, wherein the frame comprises connecting means for connection to a headrest and/or to one or more rods connecting the headrest to the seat.

21. The neck rest of claim 19, wherein the frame comprises base mounting means for connection to the base inflatable bladder, and at least two side mounting means for respective connection to the at least two side inflatable bladders.

* * * * *